(12) United States Patent
Peukert

(10) Patent No.: US 8,694,561 B2
(45) Date of Patent: *Apr. 8, 2014

(54) SYSTEM AND METHOD OF OPTIMIZING PERFORMANCE OF SCHEMA MATCHING

(75) Inventor: Eric Peukert, Dresden (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,383

(22) Filed: Jun. 7, 2012

(65) Prior Publication Data

US 2012/0259896 A1 Oct. 11, 2012

Related U.S. Application Data

(63) Continuation of application No. 12/719,684, filed on Mar. 8, 2010, now Pat. No. 8,219,596.

(51) Int. Cl.
*G06F 7/00* (2006.01)
*G06F 17/30* (2006.01)

(52) U.S. Cl.
USPC .......................................................... 707/808

(58) Field of Classification Search
None
See application file for complete search history.

(56) References Cited

U.S. PATENT DOCUMENTS

2011/0131253 A1 6/2011 Peukert

OTHER PUBLICATIONS

Rahm et al., "A Survey of Approaches to Automatic Schema Matching", The VLDB Journal 10, pp. 334-350, Springer-Verlag, 2001.*
Madhaven et al., "Generic Schema Matching with Cupid", Technical Report, 2001, Microsoft Research.*
Duchateau et al., "A Flexible Approach for Planning Schema Matching Algorithms", OTM 2008, Part I, LNCS 5331, pp. 249-264, 2008, Springer-Verlag Berlin Heidelberg.*
Cruz et al., "AgreementMaker: Efficient Matching for Large Real-World Schemas and Ontologies", VLDB '09, pp. 1586-1589, ACM, 2009.*
Aumueller et al., "Schema and Ontology Matching with COMA++", SIGMOD 2005, pp. 906-908, ACM, 2005.*
Do et al., "COMA—A system for flexible combination of schema matching approaches", Proceedings of the $28^{th}$ VLDB Conference, pp. 610-621, 2002, ACM.*
Bernstein et al., "Industrial-strength schema matching", ACM SIGMOD Record, vol. 33, Issue, 4, pp. 38-43, 2004, ACM.*
D. Abadi, A. Marcus, S.R. Madden, K. Hollenbach, "Scalable Semantic Web Data Management Using Vertical Partitioning," VLDB '07, Sep. 23-28, 2007, Vienna, Austria.
R. Baxter, P. Christen, T. Churches, "A Comparison of Fast Blocking methods for Record Linkage," CMIS Technical Report, 03/139, Data Cleaning, Aug. 24-27, 2003.
P. Bernstein and S. Melnik, "Model Management 2.0: Manipulating Richer Mappings," SIGMOD '07, Jun. 12-14, 2007, Beijing China.
P. Bernstein, S. Melnik, M. Petropoulos, C. Quix, "Industrial-Stength Schema Matching," SIGMOD Record, vol. 33, No. 4, Dec. 2004.

(Continued)

*Primary Examiner* — Michael Hicks
(74) *Attorney, Agent, or Firm* — Fountainhead Law Group PC

(57) ABSTRACT

In one embodiment the present invention includes a computer-implemented method of improving performance of schema matching. The method includes storing a matching topology that maps a first data structure to a second data structure. The method further includes identifying a first portion of the matching topology that is a candidate for improvement as determined according to an incidence graph. The method further includes rewriting the first portion of the matching topology with a second portion according to the incidence graph.

38 Claims, 14 Drawing Sheets

(56) References Cited

OTHER PUBLICATIONS

C. Caracciolo, J. Euzenat, L. Hollink, R. Ichise, A. Isaac, V. Malaise, C. Meilicke, J. Pane, P. Shvaiko, H. Stuckenschmidt, O. Svab-Zamazal, and V. Svatek, "Results of the Ontology Alignment Evaluation Initiative 2008," ISWC Workshop on Ontology Matching (OM-2008).

H.H. Do, "Schema Matching and Mapping-Based Data Integration," Ph.D. Thesis, Aug. 2005.

H.H. Do and E. Rahm, "COMA—A System for Flexible Combination of Schema Matching Approaches," Proceedings of the 28th VLDB Conference, Hong Kong, China 2002.

H.H. Do and E. Rahm, "Matching Large Schemas: Approaches and Evaluation," Information Systems 32 (2007), pp. 857-885.

C. Drumm, M. Schmit, and H.H. Do, "QuickMig—Automatic Schema Matching for Data Migration Projects," CIKM '07, Nov. 6-8, 2007, Lisboa, Portugal.

F. Duchateau, Z. Bellahsene and R. Coletta, "A Flexible Approach for Planning Schema Matching Algorithms," Proc. OTM: On the Move to Meaningful Internet Systems, Nov. 2008. pp. 249-264.

F. Duchateau, Z. Bellhsene, M. Roantree and M. Roche, "Poster Session: An Indexing Structure for Automatic Schema Matching," SMDB-ICDE: International Workshop on Self-Managing Database System, 2007.

E. Ehrig and S. Staab, "QOM—Quck Ontology Mapping," ISWC 2004.

M. Ehrig, S. Staab, and Y. Sure, "Bootstrapping Ontology Alignment Methods with APFEL," WWW 2005, My 1-14, 2005, Chiba, Japan.

J. Euzenat and P. Shvaiko, "Ontology Matching," pp. 61-72, 2007.

J-R. Falleri, M. Huchard, M. LaFourcade, and C. Nebut, "Metamodel Matching for Automatic Model Transformation Generation," Proc. MoDELS, 2008.

L. Gravano, P.G. Ipeirotis, and H.V. Jagadish, "Approximate String Joins in a Database (Almost) for Free," Proceedings of the 27th Conf., Roma, Italy 2001.

P.A.V. Hall and G.R. Dowling, "Approximate String Matching," ACM, Computing Surveys, vol. 12, No. 4, Dec. 1980.

W. Hu and Y. Qu, "Block Matching for Ontologies," ISWC, 2006.

W. Hu and Y. Qu, "Falcon-AO: A Practical Ontology Matching System," Web semantics: Science, Services and agents on the World Wide Web, pp. 237-239, 2008.

W. Hu, Y. Qu, and G. Cheng, "Matching Large Ontologies: A Divide-and-Conquer Approach," Data & Knowledge Engineering; pp. 140-160, 2008.

M. Sayyadian, Y. Lee and A H Doan, and A.S. Rosenthal, "Tuning Schema Matching Software using Synthetic Scenarios," Proceedings of the 31st VLDB Conference, Trondheim, Norway, 2005.

J. Li, J. Tang, Y. Li, and Q. Luo, "RiMOM: A Dynamic Multistrategy Ontology Alignment Framework," IEEE Transactions on Knowledge and Data Engineering, Vo. 21, No. X, 2009.

J. Madhavan, P. Bernstein, and E. Rahm, "Generic Schema Matching with Cupid," Proc. VLDB, Aug. 2001.

S. Melnik, H. Garcia-Molina, and E. Rahm, "Similarity Flooding: A Versatile Graph Matching Algorithm and its Application to Schema Matching," Proceedings of the 18th International Conference on Data Engineering, (ICDE '02) 2002.

M. Mochol, A. Jentzsch, and J. Euzenat, "Applying an Analytic method for Matching Approach Selection," The First International Workshop on Ontology Matching, 2006.

N.F. Noy and M.A. Musen, "The PROMPT Suite: Interactive Tools for Ontology Merging and Mapping," Int. J. Hum.-Comput. Stud., 59, Aug. 2003.

H. Paulheim, "On Applying Matching Tools to Large-Scale Ontologies," The Third International Workshop on Ontology Matching, 2008.

E. Rahm and P.A. Bernstein, "A Survey of Approaches to Automatic Schema Matching," The VLDB Journal 10: 334-350, Feb. 2001.

K. Saleem and Z. Bellahsene, "PORSCHE: Performance ORiented SCHEma Mediation," Inf. Syst., 33, Feb. 2008.

P. Shvaiko and J. Euzenat, "A Survey of Schema-based Matching Approaches," Journal of Data Semantics IV, 2005.

M. Smiljanic, M. Van Kuelen, W. Jonker, "Using Element Clustering to Increase the Efficiency of XML Schema Matching," Proc. ICDE Workshops, 2006.

H. Tan and P. Lambrix, "A Method for Recommending Ontology Alignment Strategies," ISWC/ASWC, 2007.

Y.R. Jean-Mary, E.P. Shironoshita, M.R. Kabuka, "Ontology Matching with Semantic Verification," Web Semantics: Science, Services and Agents on the World Wide Web, Mar. 2008.

Schema Matching, from Wikipedia, the free encyclopedia. http://en.wikipedia.org/wiki/Schema_matching. Feb. 28, 2010.

L. Palopoli, G. Terracina, D. Ursino, "Experiences Using DIKE, a System for Supporting Cooperative Information System and Data Warehouse Design," Information Systems 28 (2003) pp. 835-865.

Anan Marie and Avigdor Gal, "Boosting Schema Matchers," On the Move to Meaningful Internet Systems: OTM 2008; Springer Berlin Heidelberg, Berlin, pp. 283-300. Nov. 9, 2008.

Eric Peukert, Henrike Berthold, and Erhard Rahm, "Rewrite Techniques for Performance Optimization of Schema Matching Processes," Proceedings of the 13th International Conference on Extending Database Technology, EDBT '10. p. 423. Mar. 22, 2010.

Juanzi Li, Jie Tang, Yi Li, and Qiong Luo, "RiMOM: A Dynamic Multistrategy Ontology Alignment Framework," IEEE Transactions on Knowledge and Data engineering, IEEE Service Center, vol. 21, No. 8, Aug. 1, 2009.

Hanna Koepcke and Erhard Rahm, "Training Selesction for Tuning Entity Matching," VLDB 08, Auckland, New Zealand. Aug. 24-30, 2008.

Hong-Hai Do and Erhard Rahm, "COMA—A System for Flexible Combination of Schema Matching Approaches," Proceedings of the 28th VLDB Conference, Hong Kong, China. Jan. 1, 2002.

Zohra Bellahsene and Fabien Duchateau, "Tuning for Schema Matching," in Schema Matching and Mapping, Springer Berlin Heidelberg. pp. 293-316. Dec. 16, 2010.

Yoonkyong Lee, Mayssam Sayyadian, Anhai Doan, and Arnon S. Rosenthal, "eTuner: Tuning Schema Matching Software Using Synthetic Scenarios," The VLDB Journal. The International Journal on Very Large Data Bases, Springer Berlin, vol. 16, No. 1. Sep. 14, 2006.

Extended European Search Report (from a corresponding foreign application), EP11001800.9, mailed Oct. 28, 2011.

\* cited by examiner

| Pattern | $mat_x \longrightarrow mat_y$ |
|---|---|
| condition | |
| Applied Change | $mat_x \longrightarrow F \longrightarrow mat_y$ |

```
Process applyRule
Input: Incidence Graph IG
Input: Matching Process MP
Input: Rewrite Rule RW
Output: Rewritten Process MP'
1.  MP' ← MP
2.  patInstances ← findPatterns(RW,MP)
3.  costMap ← ∅
4.  for each pInst in patInstances
5.      cost ← computeCost(pInst,IG,RW)
6.      costMap.put(pInst,cost)
7.  if costMap.size() > 0
8.      best ← costMap.getMinimum()
9.      MP' ← rewrite(best,RW)
10.     MP' ← applyRule(MP',IG,RW)
```

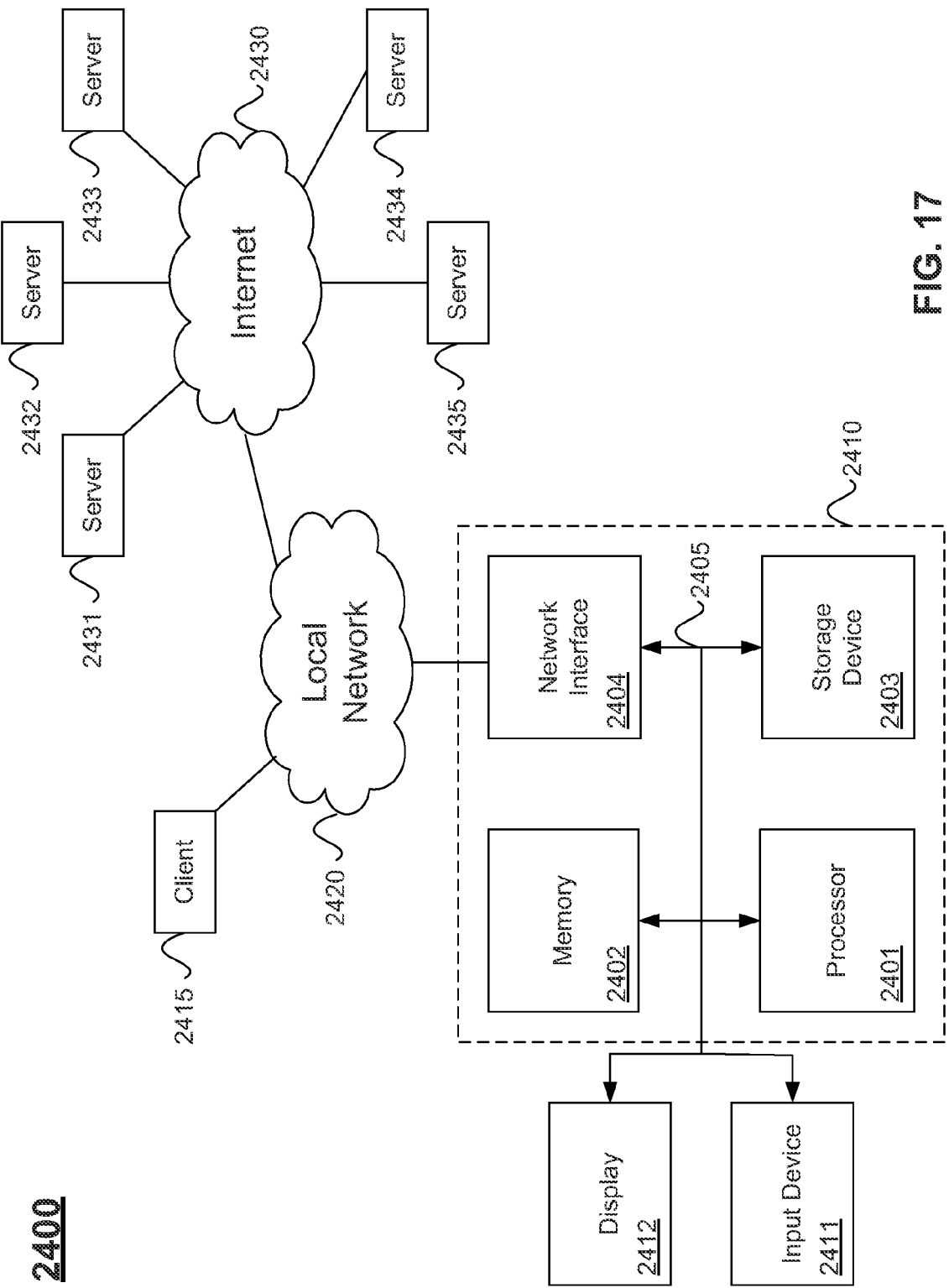

SYSTEM AND METHOD OF OPTIMIZING PERFORMANCE OF SCHEMA MATCHING

CROSS REFERENCE TO RELATED APPLICATIONS

The present application is a continuation of U.S. application Ser. No. 12/719,684 for "System and Method of Optimizing Performance of Schema Matching", filed Mar. 8, 2010, which is incorporated herein by reference.

BACKGROUND

The present invention relates to database applications, and in particular, to schema matching.

Unless otherwise indicated herein, the approaches described in this section are not prior art to the claims in this application and are not admitted to be prior art by inclusion in this section.

A recurring manual task in data integration, ontology alignment or model management is finding mappings between complex meta data structures. In order to reduce the manual effort, many matching algorithms for semi-automatically computing mappings were introduced.

Unfortunately, current matching systems severely lack performance when matching large schemas. Recently, some systems tried to tackle the performance problem within individual matching approaches. However, none of them developed solutions on the level of matching processes.

Finding mappings between complex meta data structures as required in data integration, ontology evolution or model management is a time-consuming and error-prone task. This task may be called schema matching, but it can also be labeled ontology alignment or model matching. Schema matching is non-trivial for several reasons. Schemas are often very large and complex. They contain cryptic element names, their schema documentation is mostly scarce or missing, and the original authors are unknown. Some estimate that up to 40% of the work in enterprise IT departments is spent on data mapping.

For that reason, many algorithms (so-called matchers) were developed that try to automate the schema matching task partly. They compute correspondences between elements of schemas based on syntactical, linguistic and structural schema- and instance-information and provide the user with the most likely mapping candidates. Many systems combine the results of a number of these matchers to achieve better mapping results. The idea is to combine complementary strengths of different matchers for different sorts of schemas. This balances problems and weaknesses of individual matchers, so that better mapping results can be achieved.

A wealth of schema matching techniques can be found in literature. See, e.g., E. Rahm and P. A. Bernstein, A survey of approaches to automatic schema matching, in The VLDB Journal, 10 (2001); and P. Shvaiko and J. Euzenat, A Survey of Schema-Based Matching Approaches, in Journal on Data Semantics IV (2005). Some techniques primarily rely on available schema information, whereas others rely on instance data and additional sources like thesauri or dictionaries. The way how the input information is processed highly influences individual performance properties of a matching algorithm. Element level techniques only consider schema elements in isolation such as string-based edit distance, n-gram and soundex code. These techniques are simpler than structure-based approaches and can thus be executed faster.

Examples of schema matching techniques include the ASMOV-System (Automated Semantic Mapping of Ontologies with Validation), the RiMOM-System (Risk Minimization based Ontology Mapping), the SimFlooding approach, Cupid (a schema matching tool from Microsoft Research Labs), the B-Match-Approach, Apfel, eTuner, and the MatchPlanner-System.

All currently promoted matching systems, as understood, use a combination of different matching techniques for improving the quality matching results. The topology of the matching system has a major impact on the performance and the quality of a matching task.

In a recent product release, SAP introduced a new business process modeling tool integrating automatic schema matching for the task of mapping large service interfaces. Computed correspondences are used as a recommendation and starting point to a manual mapping of service interfaces. Therefore suggestions need to have a good quality in order to avoid extra work for correcting wrongly identified correspondences. At the same time, the computation of mapping suggestions must be fast so that the user is not interrupted in the modeling process. After having spent too much time on waiting, some users will not apply auto matching recommendation again. Unfortunately, current state of the art matching systems severely lack performance when matching large schemas. For that reason, only a small set of matchers is currently used, which restricts the achievable result quality.

The reasons for these performance problems are theorized as follows. Schema matching is a combinatorial problem with at least quadratic complexity w.r.t. schema sizes. Even naive algorithms can by highly inefficient on large-sized schemas. Matching two schemas of average size N using k match algorithms results in a runtime complexity of $O(kN^2)$. Thus schema matching complexity can easily explode if multiple matchers are applied on bigger sized schemas. Even the most effective schema matching tools in the recent OAEI (Ontology Alignment Evaluation Initiative) Ontology Alignment Contest (OAEI2008) suffered from performance issues.

As discussed in more detail below, only a few systems have addressed the performance problem for schema matching. Unfortunately, most of the proposed techniques are built for individual matchers or are hard wired within specific matching processes.

SUMMARY

Embodiments of the present invention improve the performance of schema matching. In general, the following description details a rewrite-based optimization technique that is generally applicable to different types of matching processes. Filter-based rewrite rules similar to predicate push-down in query optimization are described. In addition a modeling tool and recommendation system for rewriting matching processes is described. An evaluation on matching large web service message types shows significant performance improvements without losing the quality of automatically computed results.

In one embodiment the present invention includes a computer-implemented method of improving performance of schema matching. The method includes storing a matching topology that maps a first data structure to a second data structure. The method further includes identifying a first portion of the matching topology that is a candidate for improvement as determined according to an incidence graph. The method further includes rewriting the first portion of the matching topology with a second portion according to the incidence graph.

The method may be implemented by a computer program that is executed by a computer system.

A computer system may be configured to implement the method.

The following detailed description and accompanying drawings provide a better understanding of the nature and advantages of the present invention.

BRIEF DESCRIPTION OF THE DRAWINGS

FIG. 17 is a block diagram of an example computer system and network for implementing embodiments of the present invention.

DETAILED DESCRIPTION

Figure 1:
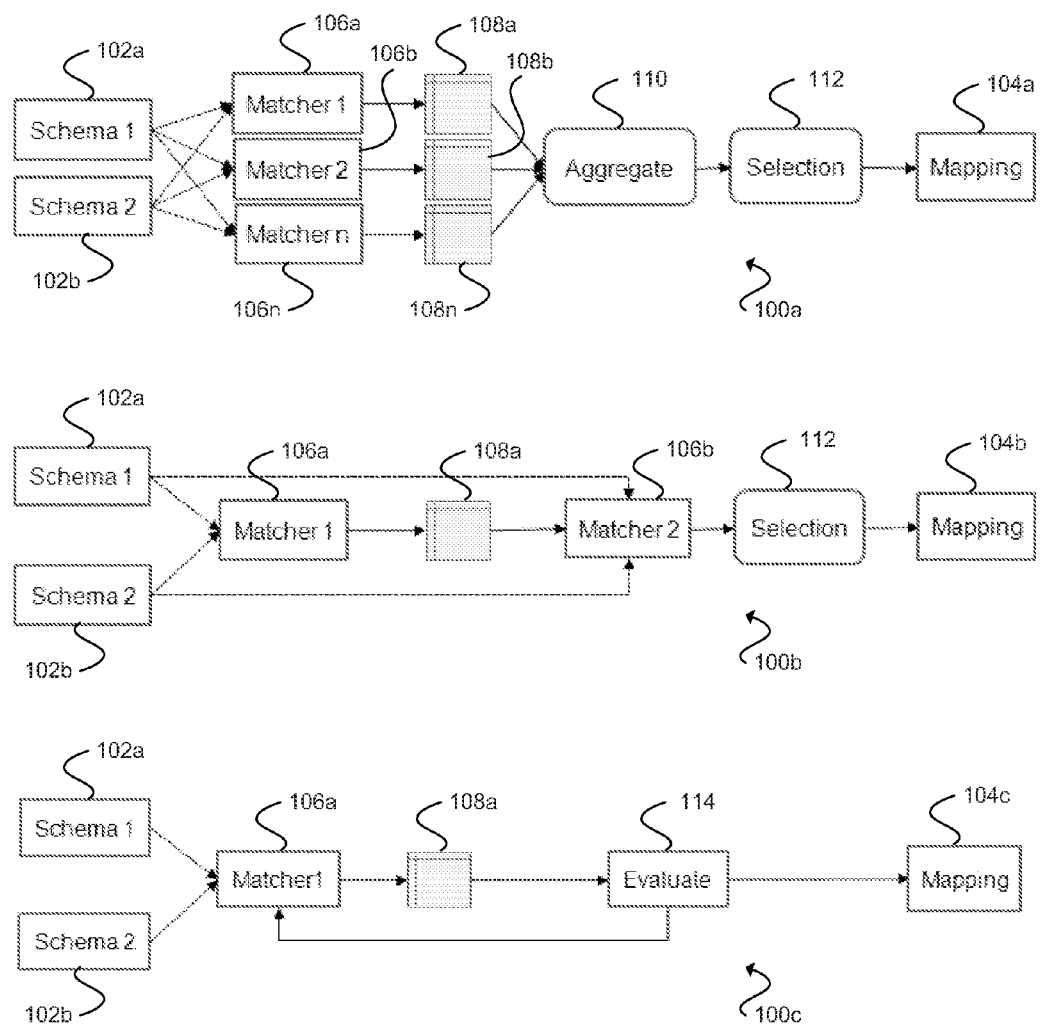
FIG. 1 is a block diagram that shows three mapping topologies.

Described herein are techniques for schema matching. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

Section 1: Introduction

The following description details a generic rewrite-based approach for significantly improving the performance of matching processes. Optimizing a matching process in this way is similar to that of query optimization in databases. Matching processes are modeled as graphs and rewrite techniques are applied to improve the performance and to retain or improve the result quality of matching processes. The process rewrite approach is orthogonal to existing techniques for improving the performance of matching systems.

Noteworthy aspects of embodiments of the present invention include:

Flexible matching process: Schema matching processes are modeled as graphs where nodes are operators and edges represent data flow. A set of operators and their functionality are described. The process graph model contains a filter operator that is able to prune comparisons between elements early in the matching process. This pruning is supported by a new data structure, a so-called comparison matrix. This matrix is used by matchers to decide what element comparisons are necessary. Two types of filter operators are described: a static threshold-based filtering and a dynamic filtering. The dynamic filtering allows the system to prune comparisons without losing on precision and recall.

Rewrite-based optimization: Analogous to cost-based rewrites in database query optimization, the performance improvement problem is treated as a rewrite problem on matching processes. This allows expressing performance and quality improvement techniques by special rewrite rules. In particular, filter-based rewrite rules utilizing the proposed filter operator are used. A cost model is used to decide which parts of a matching process to rewrite.

A tool for modeling matching processes and a recommender system for rewrites: A tool may be used for modeling schema matching processes. The modeled processes can later be executed by users of schema matching systems. Additionally a recommender system applies the rewrite rules onto the modeled processes.

Real world evaluation: We evaluated the performance improvement of our approach on real SAP service interfaces. The results show that a significant performance improvement can be achieved without losing the quality of the applied matching system.

The remainder of this description is organized as follows: Section 2 provides a preliminary discussion regarding schema matching. Section 3 introduces the matching process graph model. Section 4 describes the graph based rewrite technique, the filter operator, and the filter-based rewrite rule. Section 5 presents the tool for modeling matching processes and the recommendation system. Section 6 provides an evaluation of the system. Section 7 summarizes the embodiments of the system.

Section 2: Preliminaries

FIG. 1 is a block diagram that shows three different mapping topologies 100: parallel combination 100a, sequential combination 100b, and iterative computation 100c. The topologies 100 start with two schemas 102a, 102b (collectively 102) and end with mappings 104a, 104b and 104c (collectively 104). Between the schemas 102 and the mappings 104 are matchers 106, similarity matrices 108, aggregators 110, selectors 112, and evaluators 114.

Parallel combination 100a shows that all matchers 106a, 106b and 106n are executed independently, typically on the whole cross product of source- and target-schema elements. Results of individual matchers 106, so-called similarity matrices 108a, 108b and 108c, are put into a similarity cube. The similarity aggregation operation 110 reduces the cube down to a single similarity matrix and the selection operator 112 cuts off similarity values by using a threshold. Unfortunately, parallel combination approaches may result in performance problems if all matchers are executed for all comparisons.

Sequential combination 100b relies on a sequence of matchers 106a and 106b to narrow down a set of mapping candidates. This sequencing can improve performance since the search space is reduced by the first matchers. However, the performance improvement is achieved at the risk of losing possible mapping results. Unfortunately, building and extending such systems is cumbersome and the order of matchers within sequential systems is fixed. A step towards simplifying the construction of sequential matching strategies is the refine operator. It allows to put a mapping result as input to a matcher that can then refine the found correspondences.

Iterative computation 100c aims at an iterative improvement of the mapping result but it can severely lose on performance. The three topologies may be combined in order to improve their result mapping.

Embodiments of the present invention focus on automatically finding the best order of matchers within a given matching process to improve runtime performance. Given a number of matchers, the system learns a decision-tree that combines these matchers. As a side-effect, by restricting the number of matchers and the deepness of the tree, a user can influence the performance of the matching system at the cost of result quality. Unfortunately, these decision trees need to be learned for every new domain. Also, the effort of executing the matchers of a given tree for every source/target element pair is still high.

In contrast to previous work, embodiments of the present invention aim at a flexible rule-based approach to optimize the performance of general match processes. This approach is able to model arbitrary parallel, sequential and iterative matching systems including the functionality that the refine operator offers. Also, embodiments are able to transform parallel combinations of matchers into faster sequential combinations without losing on precision and recall.

Section 3: Matching Process Model

Embodiments of the present invention implement a meta matching system approach.

The embodiments treat matchers and matching systems as abstract components that can be organized in processes. Embodiments model matching systems as a complex graph-based matching process.

Definition 1. A matching process MP is represented by a matching process graph. The vertices in this directed graph represent operations from an operator library L. Each vertex can be annotated with a set of parameters. Edges within the graph determine the execution order of operations and the data flow (exchange of schemas and mappings between operations). In order to allow modeling performance aspects on the process level we also use so-called comparison matrices as part of the data flow.

Before describing our set of operations we first need to introduce some foundations of our matching process model such as schema, mapping, and comparison matrix.

A schema S consists of a set of schema elements. Each schema element s has a name, a data type, one or no parent schema element, and a set of children schema elements. The kind of schema is not restricted and can refer to any meta data structure that can be matched such as trees, ontologies, meta models, as well as database schemas.

A mapping M between a source schema S and target schema T is a quadruple (S, T, A, CM). The similarity matrix $A=(a_{ij})$ has $|S|\times|T|$ cells to represent a match result. Each cell $a_{ij}$ contains a similarity value between 0 and 1 representing the similarity between the ith element of the source schema and the jth element of the target schema. The optional comparison matrix CM defines which elements of a source schema need to be compared with elements of the target in further match operations. This matrix is defined as $CM=(cm_{ij})$ with $|S|\times|T|$ cells. Each cell $cm_{ij}$ contains a boolean value that defines whether the comparison should be performed in the following match-operations. The role of the comparison matrix will be described in detail in the following sections.

Operations take the data of the input edges and produce data on an output edge. Each operation has a set of parameters that can be set. The operations are typed. This implies that the sequence of operations within a process is restricted by the input and output data of the individual operations, i.e. some operations in the graph need mappings as input whereas others need schemas.

Embodiments of the present invention include the following operations in an operation library:

The SchemaInput $S_{in}$ and MappingOutput $M_{out}$ are specific operations that represent the interface to a matching process. The schema-input operation takes a meta data structure as input and creates a schema as output, whereas the mapping-output takes a mapping as input and returns arbitrary mapping formats as output.

The SchemaFilter operation SF filters incoming schemas to a given context, e.g. all non leaf elements could be removed from a schema. The output of the Schema-Filter is again a schema but with a possibly smaller set of schema elements. This operation is similar to context-filters in COMA++ that narrow the context that is required for a matching task.

The Match operation mat either takes a source and a target schema S, T or a mapping M as input. If a mapping is given, the attached source and target schemas and the comparison matrix CM are used for matching. If no comparison matrix is given, it will be initialized by setting all its cells to true. A parameter defines the type of match algorithm to be used. The match operation returns a new mapping A: A=mat(S, T, CM). It computes a similarity between two schema elements i and j if the value of $cm_{ij}$ in CM is true.

The Selection operation Sel takes a mapping A as input and produces a mapping B. It applies a condition cond on each cell. If the condition evaluates to false, the value of the cell is set to 0; otherwise $b_{ij}=a_{ij}$. Different selection conditions may be used such as threshold, delta or topN.

The Aggregate operation Agg takes n mappings $A_1,\ldots,A_n$ that refer to the same source and target schemas and aggregates them to a single mapping B using the aggregation function f. The entries of B are computed by $b_{ij}=f(a_{1ij},\ldots,a_{nij})$.

The behavior of the aggregation depends on the aggregation function f. We subsume common aggregation functions such as weighted sum, average or max under aggregate union Aggunion operations. However, f could also perform an intersection Aggintsect of given mappings: An entry in B contains a value greater than 0 only for those cells that have a value greater than 0 in all input mappings. The similarity value of each cell in B is calculated by applying f: $b_{ij}=f(a_{1ij}, \ldots, a_{kij})$ iff$\forall$k: $a_{kij}>0$ otherwise $b_{ij}=0$.

The Filter operation F takes as input a mapping A, the comparison matrix CM that is referenced by A, and a filter condition cond. It applies the filter condition cond to all entries $a_{ij} \in A$. The output of the filter operation is the mapping A together with its new comparison matrix CM'. If cond $(sim_{ij})$=true^$cm_{ij}$=true then $cm'_{ij}$=true; otherwise $cm'_{ij}$=false. In a subsequent section two conditions for cond are detailed: a static threshold-based condition and a dynamic condition. Throughout this description, the filter operation is then either referenced by $F_{th}$ for the threshold-based case and $F_{dyn}$ for the dynamic case.

The introduced set of operations is not exhaustive (e.g., a difference operation $Agg_{difference}$ could also be included), but it covers enough operations to model a broad range of matching processes. In particular it contains operations and data structures that allow to improve the performance of matching processes.

Figure 2:
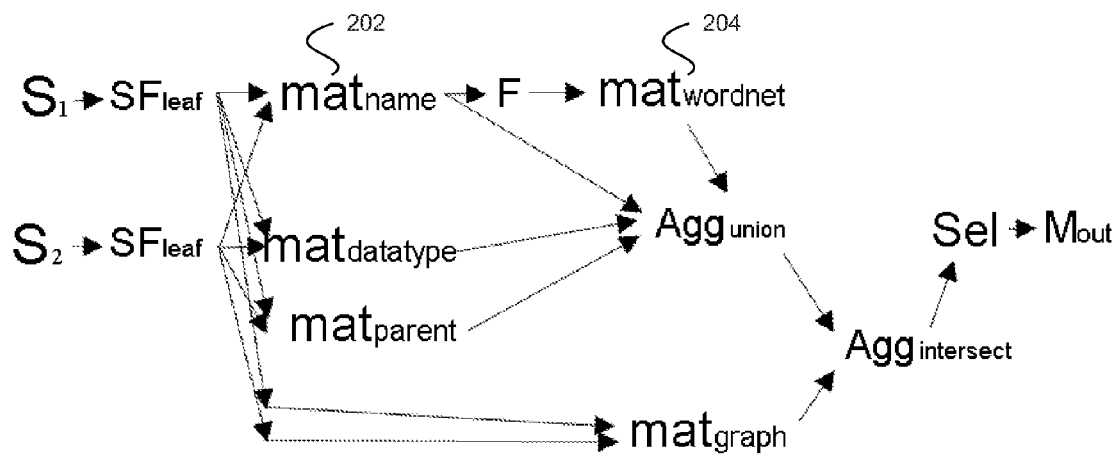
FIG. 2 is a diagram showing an example of a complex matching process that can be constructed by applying our model, according to an embodiment of the present invention.

FIG. 2 is a diagram showing an example of a complex matching process that can be constructed by applying our model, according to an embodiment of the present invention. The visualized process contains parallel and sequential elements. Results of different types of matchers are treated differently. For instance, the non-matching element comparisons from the name matcher 202 are matched with a wordnet matcher 204. An intersection of results from different match-approaches typically improves the overall precision.

Section 4: Graph Based Rewrite Technique

After having defined the preliminaries of our graph model we are now introducing our graph based rewrite techniques for matching processes. What we describe can be seen in analogy to database query optimization. However, there are some major differences that will be discussed throughout this section. Particularly, our rewrite rules could lead to changes in the execution result of a matching process while database query optimization leaves the query results unchanged. One implementation of rewrite-based process optimization can be defined as follows:

Definition 2. Given:
A matching process MP as defined above.
A set of Rewrite Rules RW that transform a matching process MP into a rewritten matching process MP'.
A utility function U running over a matching process MP. The function can be defined over precision, recall and/or performance of the matching process.

The goal of rewrite-based matching process optimization is to create a new matching process MP' by applying rule rw$\in$RW onto a matching process MP so that U(MP')>U(MP).

Figure 3:
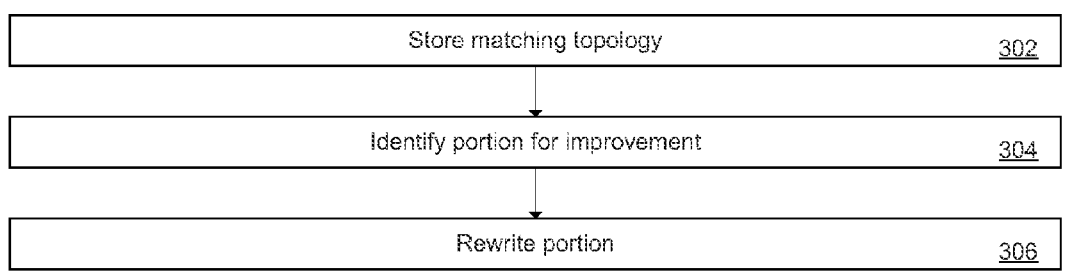
FIG. 3 is a flowchart of a computer-implemented process of improving performance of schema matching, according to an embodiment of the present invention.

FIG. 3 is a flowchart of a computer-implemented process 300 of improving performance of schema matching, according to an embodiment of the present invention. The process 300 may be executed by a computer system (as described in more detail below) that is controlled by a computer program that implements the process 300.

In 302, the computer system stores a matching topology that maps a first data structure to a second data structure. For example, in FIG. 1 the matching topology 100a maps the schema 102a to the schema 102b (and vice versa). The matching topology generally includes the operations discussed above.

In 304, the computer system identifies a first portion of the matching topology that is a candidate for improvement as determined according to a utility function. For example, in FIG. 1 the matchers 106a, 106b and 106n may be candidates for improvement, such that their similarity cube (the combination of the similarity matrices 108a, 108b and 108n) is reduced in complexity. The specific utility function implemented according to an embodiment of the present invention is the incidence graph, which is further detailed below.

In 306, the computer system rewrites the first portion of the matching topology with a second portion, according to the incidence graph. For example, in FIG. 1 the parallel structure of 100a (106a, 106b and 106n in parallel) may be rewritten with the sequential structure of 100b (106a and 106b in sequence). Further details regarding the rewrite process are given below.

The process 300 may also be implemented as a computer program that is embodied on a tangible recording medium. The computer program includes a storage program, an identification program, and a rewrite program. The storage program is configured to control the computer system to store a matching topology that maps a first data structure to a second data structure (see 302). The identification program is configured to control the computer system to identify a first portion of the matching topology that is a candidate for improvement as determined according to an incidence graph (see 304). The rewrite program is configured to control the computer system to rewrite the first portion of the matching topology with a second portion according to the incidence graph (see 306). Further details of this computer program can be seen in FIG. 14.

The process 300 may also be executed by a computer system that includes a client computer and a server computer that are connected via a network. The server computer is configured to store a matching topology that maps a first data structure to a second data structure (see 302), to identify a first portion of the matching topology that is a candidate for improvement as determined according to an incidence graph (see 304), and to rewrite the first portion of the matching topology with a second portion according to the incidence graph (see 306). The client computer is configured to process user input for a user to edit the matching topology. Further details of this computer system can be seen in FIG. 17.

The process 300 may include the ability of a user to review and evaluate the process 300 as it is being executed. For example, the user may create and edit the matching topology (see, e.g., the matching process modeling tool 1402 in FIG. 14). The computer system may display the improvement metrics for the first portion and the second portion, and the user may select the second portion so that the computer system may rewrite the first portion with the second portion.

Section 4.1: Filter Operators

In order to allow modeling performance aspects on the process level, embodiments of the present invention use the introduced Filter operator and the comparison matrix.

Figure 4:
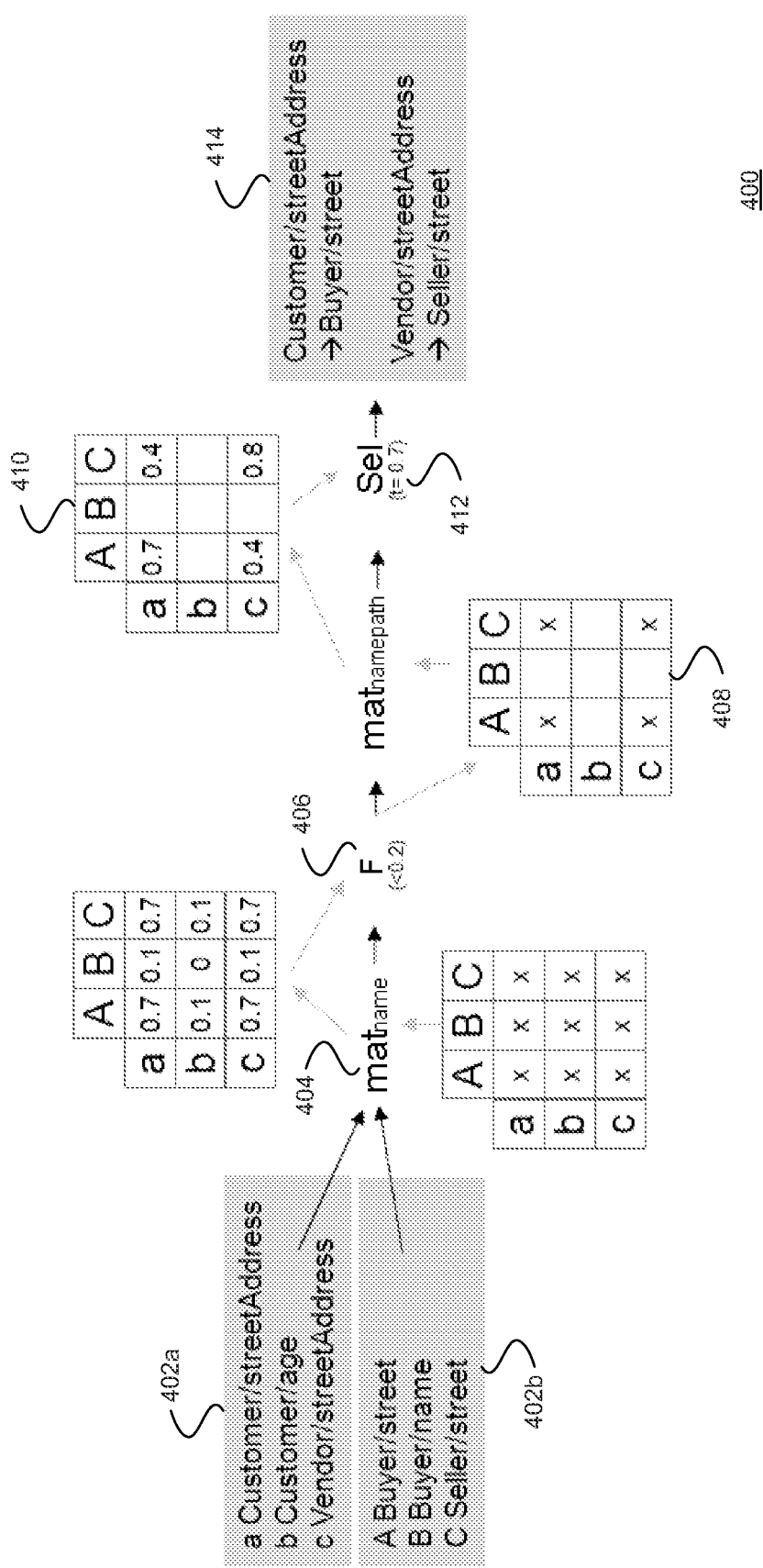
FIG. 4 is a diagram showing an example of applying a comparison matrix in a sequential matching process.

FIG. 4 is a diagram showing an example of applying a comparison matrix in a sequential matching process 400. Two schemas 402a and 402b are first matched using the name matcher $mat_{name}$ 404. Element pairs with a similarity lower than 0.2 (see F 406) are pruned out by setting the corresponding cells in the comparison matrix 408 to false (visualized as a cross in the comparison matrix 408). The namepath matcher $mat_{namepath}$ 410 then only computes similarities for the comparisons that are still in the comparison matrix (i.e., the empty cells in the comparison matrix 408), resulting in the similarity matrix 410. In the example, more than half of the comparisons are pruned out. Finally, the Sel operator 412 prunes out matches with a similarity less than 0.7, resulting in a match between Customer/streetAddress and Buyer/street, and a match between Vendor/streetAddress and Seller/street (see 414).

Note that possible matches might be pruned out early even though they could be part of the overall mapping result. This behavior could drop recall but could also increase precision.

One goal of embodiments of the present invention is to find the best sequential combination of matchers maximizing the number of pruned element pairs and at the same time minimizing the number of wrongly pruned comparisons that are part of the final mapping. The optimal solution would only drop comparisons that lost the chance to survive a later selection.

Section 4.2: Incidence Graph

Figure 5:
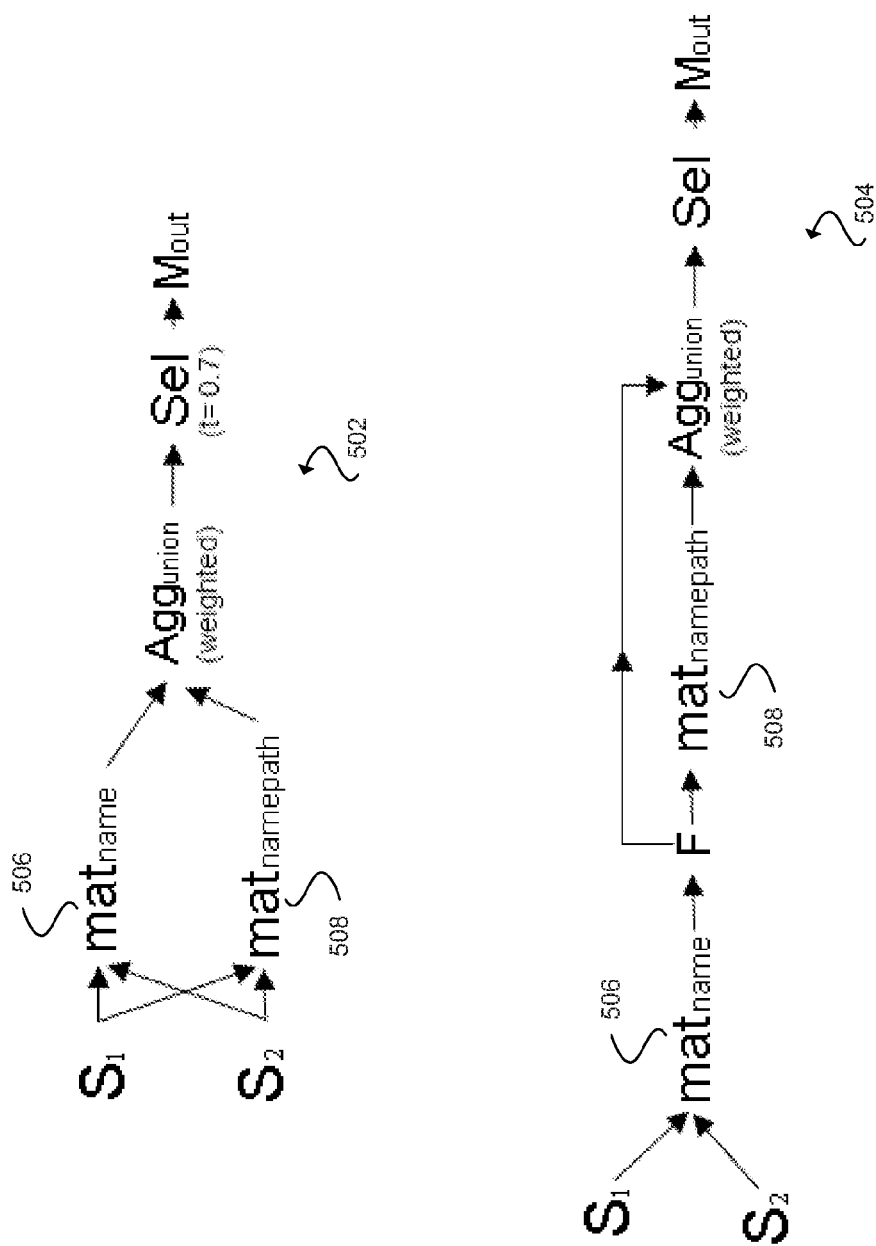
FIG. 5 is a diagram that shows a parallel combined strategy and a sequential combined strategy.

With the new filter operation, embodiments of the present invention create sequential strategies that potentially perform much faster than their parallel combined equivalent. FIG. 5 is a diagram that shows a parallel combined strategy 502 and a sequential combined strategy 504. The parallel combined strategy 502 executes a name matcher 506 and a namepath matcher 508 in parallel, and the sequential combined strategy 504 executes a name matcher 506 and a namepath matcher 508 in sequence. Executing a label-based matcher (e.g., 506) before executing a structural matcher (like the namepath matcher 508) is common in sequential matching systems as discussed in Section 2. The system includes a small library of matchers and in order to investigate the effect on performance and precision/recall (FMeasure) of bringing all possible combinations of two matchers in a sequence. The library contains the following matchers: name (NM), namepath (NPM), children (CM), parent (PM), data type (DTM), and leafs (LM). We selected a number of small sized schemas from the COMA evaluations that contain representative properties for the domain of purchase order processing. For all pair-wise combinations we created a parallel combined strategy (e.g., similar to 502) and a sequential combined strategy (e.g., similar to 504). In order to be comparable, the system automatically tuned the aggregation weights, the selection thresholds, and the filter thresholds for both strategies to achieve the best quality possible. For that purpose, the system applied a brute-force strategy of testing out the space of parameter settings in high detail.

Figure 6:
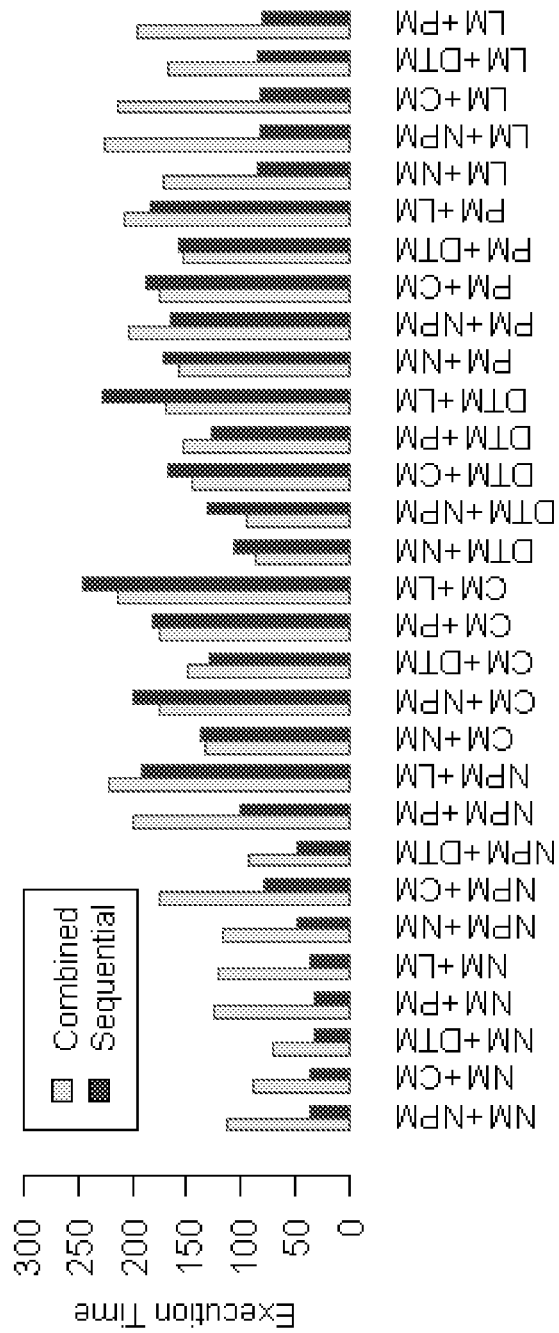
FIG. 6 is a graph that shows a visualization of comparisons between matchers.

From the best performing configuration the system selected the fastest ones and compared their execution time. FIG. 6 is a graph that shows a visualization of these comparisons. The graph compares execution time on the y-axis with different strategies consisting of pairs of matchers. For example, the entry "PM+LM" means that the parent matcher is executed sequentially before the leaf matcher; similarly the entry "LM+PM" means that the leaf matcher is executed sequentially before the parent matcher. Each pair of matchers is executed as a sequential process and as a combined (parallel) process. For the sequential processes, the process is chosen that achieves at least the FMeasure of the combined equivalent. In a number of cases the sequential execution is faster that the combined execution. In those cases some comparisons may be filtered after the first matcher executed without changing the quality. The cases where the execution times of sequential and combined are similar or sequential execution is slower, no element could be filtered without losing on quality. Since the system searched for the best quality configuration for sequential (e.g., 502) and parallel (e.g., 504; also referred to as combined) strategies, the system found sequential strategies that did not filter at all. The achieved FMeasure of such sequential strategies is equal to the parallel equivalent. These sequential strategies performed slower than the parallel ones since they had to cope with the additional filter overhead. Yet the majority of combinations used a filter threshold that was bigger than 0. The execution times of those sequential strategies are significantly smaller than the parallel ones. In some cases a significant part of comparisons was dropped out after the first matcher executed. Obviously there are some matchers that have better "filter-properties" whereas others should never serve as filter matcher. In order to make these observations reusable the system graphed the well-performing combinations in a special graph data structure called an Incidence Graph.

Definition 3. The Incidence Graph is a directed graph that describes incidence relations between matchers mat from a given matcher library Mat in a given domain of schemas. The graph vertices represent match operations. If a significant speedup (e.g., more than 20%) was achieved between matcher $mat_a$ and matcher $mat_b$, an edge ($mat_a$, $mat_b$) is added to the graph. Each match operation $mat_x$ is annotated with the time $R_x$ to execute the matcher on the simple mapping problem. Edges are annotated with the filter threshold that was found for the filter operator in the sequential execution example. They also store the percentage of the achieved speedup $P_{ab}$ when executing $mat_a$ before $mat_b$. $P_{ab}$ can be computed as follows:

$$P_{ab}=1-(R_{seq}/R_{comb})$$

with $R_{seq}$ being the runtime of the sequential strategy on the given simple mapping problem and $R_{comb}$ being the runtime for the combined (parallel) strategy. The higher the value $P_{ab}$ is the better the sequential speedup was.

Sometimes two edges ($mat_1$, $mat_2$) and ($mat_2$, $mat_1$) between two matchers $mat_1$ and $mat_2$ are put into the graph. This happens if two matchers behave similarly and therefore serve as good filter matchers for one another.

Figure 7:
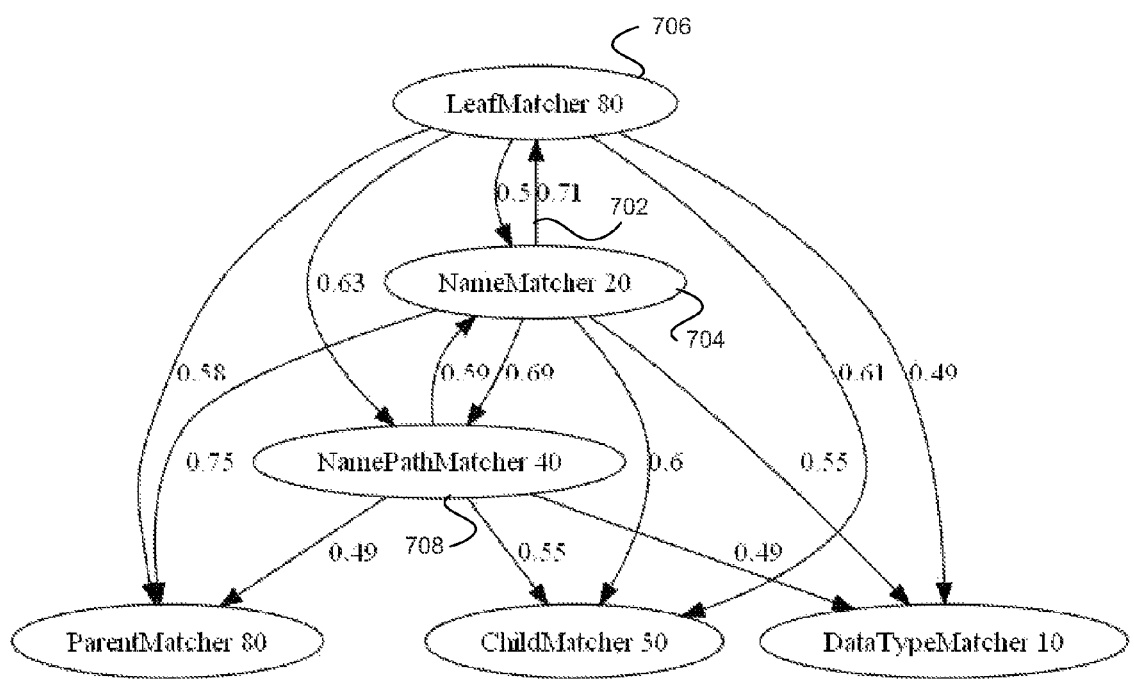
FIG. 7 is a diagram showing an exemplary incidence graph.

FIG. 7 is a diagram showing an exemplary incidence graph 700 that the system generated for the above-mentioned matcher library in the purchase order domain. For simplicity the incidence graph 700 omits the found filter thresholds. An edge 702 from the name matcher 704 to the leaf matcher 706 states the following: The runtime of sequentially executing the name matcher 704 before the leaf matcher 706 was 71% faster than the parallel combination of these matchers ($P_{ab}$-value 0.71 on the edge 702). The average runtime $R_x$ of the individual matchers on the given mapping problem is associated to the corresponding node (e.g., 10, 20, 40, etc.). We observed that the combinations that are encoded in the graph 700 are quite stable for a given matcher library and different schemas. The filter thresholds were also nearly stable across different schemas. However, the graph 700 should generally be recomputed for each new matcher library and schema domain since these properties may not be generalizable. As described in more detail below, the system uses the information about the achieved relative speedup and the individual runtime of matchers to decide which sequential combination of two matchers is the best. In particular, the information in the graph 700 is a part of the cost model used by the system. Moreover, the graph 700 is used for the evaluation of our found rewrite rules.

Figure 8:
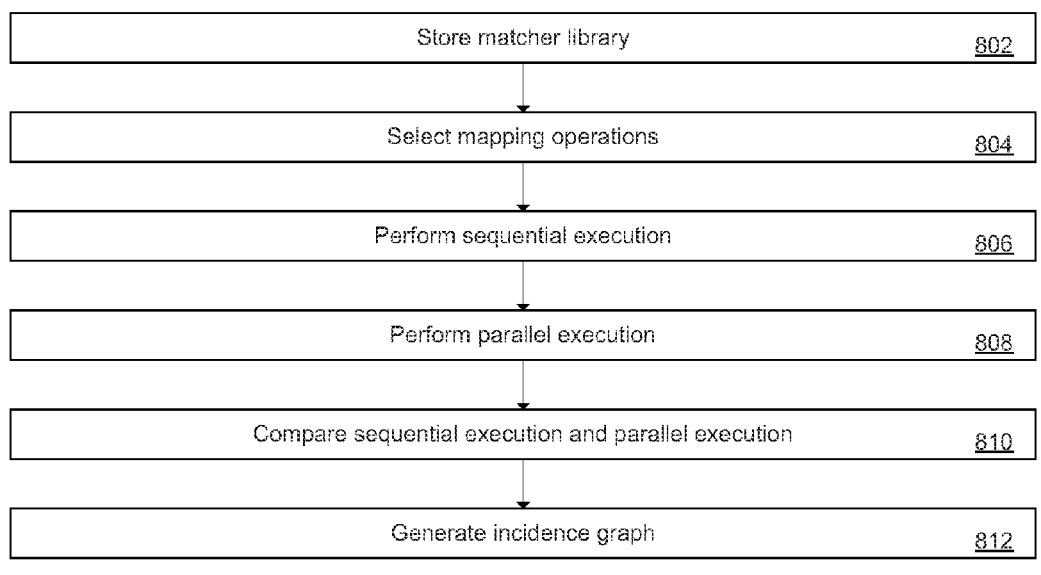
FIG. 8 is a flowchart of a process for generating an incidence graph, according to an embodiment of the present invention.

FIG. 8 is a flowchart of a process 800 for generating an incidence graph, according to an embodiment of the present invention. The process 800 may be executed by a computer system (as described in more detail below) that is controlled by a computer program that implements the process 800. For example, the analyzer component 1408 (see FIG. 14) may control the computer system to implement the process 800.

At 802, the computer system stores a matcher library. The matcher library includes a number of mapping operations. For example, as described above, the incidence graph 700 was based on a matcher library in the purchase order domain. The mapping operations may be NameMatcher, NamePathMatcher, etc. as discussed above regarding FIG. 7.

At 804, the computer system selects a first mapping operation and a second mapping operation. For example, the computer system selects a NameMatcher and a NamePathMacher (see NM+NPM in FIG. 6).

At 806, the computer system performs a sequential execution of the first mapping operation and the second mapping operation. For example, the computer system executes NM followed by NPM.

At 808, the computer system performs a parallel execution of the first mapping operation and the second mapping operation. For example, the computer system executes NM and NPM in parallel.

At 810, the computer system compares the sequential execution and the parallel execution. For example, note the difference in the execution time for the sequential and parallel (combined) cases for NM+NPM in FIG. 6.

At 812, the computer system generates the incidence graph according to the sequential execution and the parallel execution having been compared in 810 For example, the incidence graph 700 results from the system executing the comparisons (see FIG. 6) on the matcher library in the purchase order domain (described above).

Section 4.3: Filter-Based Rewrite Rule

After having introduced the matching process model, including the filter operator and the incidence graph, we can now define the matching process rewrite rules that the system implements.

Definition 4. A matching process rewrite rule specifies a match pattern, a condition that has to hold, and a description of the changes to be applied for the found pattern instances.

Figures 9A, 9B, 10:
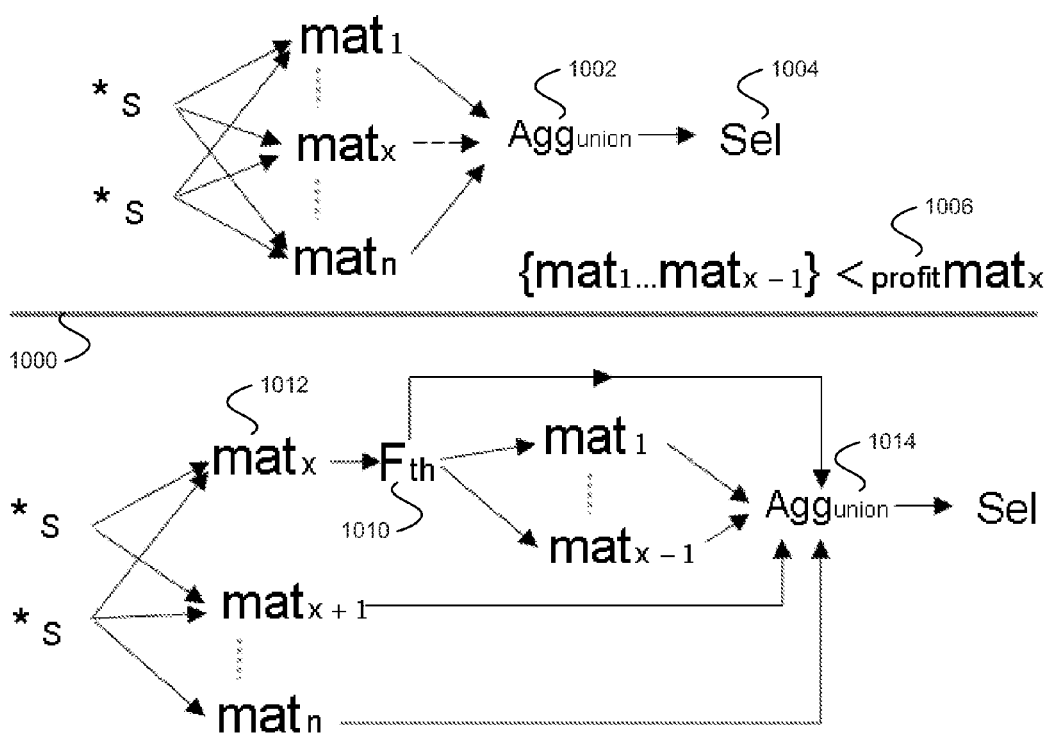
FIG. 9A is a diagram that shows the abstract notation containing pattern, condition and applied change, according to an embodiment of the present invention.
FIG. 9B is a diagram that shows a sample rule, according to an embodiment of the present invention.
FIG. 10 shows a filter-based rewrite rule $Rule_S$.

We use a simple notation for illustrating matching process rewrite rules that will be used within the following sections. FIG. 9A is a diagram that shows the abstract notation containing pattern, condition and applied change, according to an embodiment of the present invention. If the condition evaluated over a found pattern instance is true, the changes below the horizontal bar are applied to the pattern instance.

FIG. 9B is a diagram that shows a sample rule, according to an embodiment of the present invention. An arrow between two operators specifies a direct path. The rule describes a pattern for two succeeding matchers $mat_x$ and $mat_y$ within a given process graph. The rule adds a filter operation F in between a found pair of these matchers to reduce the search space for $mat_y$.

Embodiments of the present invention are directed toward filter-based rewrite rules. Other embodiments may implement a number of other rules involving other schema and mapping operators. The use of filter rewrite rules is analogous to the use of predicate push-down rules for database query optimization which reduce the number of input tuples for joins and other expensive operators. The filter-based strategy tries to reduce the number of element pairs for match processing to also speed up the execution time.

The filter rule can be generalized to more complex patterns involving several matchers. An observation to utilize is that match processes are typically finished by selections to select correspondences exceeding a certain similarity threshold as likely match candidates. The idea is then to find rules for filtering out early those pairs that will be unable to meet the final selection condition.

We illustrate this technique with a rule for matching processes using several parallel matchers. The rule utilizes a relation $<_{profit}$ over a set of matchers Mat:

A set of matchers $Mat_p = \{mat_1 \ldots mat_{n-1}\} \subset Mat$ profits from a matcher $mat_x \in Mat$ with $mat_x \notin Mat_p$ written as $Matp <_{profit} mat_x$ if the following holds: There is an edge in the incidence graph from $mat_x$ to each $mat_i \in Mat_p$. Based on that relation we can now define a filter-based rewrite rule $Rule_S$ as shown in FIG. 10. In our rewrite rules we introduce a special wildcard notation: For operators that have a schema as output we write *s and for operators that have a mapping as output we write *M. The pattern on top of the bar 1000 describes a part of a matching process that consists of two operators that output schemas *s followed by a set of matchers $\{mat_1 \ldots mat_n\}$ with $mat_x \in \{mat_1 \ldots mat_n\}$ that are executed in parallel. Their result is aggregated in the $Agg_{union}$ operation 1002 followed by a selection operation Sel 1004. The condition 1006 evaluates to true, if a set of matchers profits from $mat_x$: $\{mat_1 \ldots mat_{x-1}\} <_{profit} mat_x$.

The applied rewrite below the bar 1000 adds a filter operation F 1010 after matcher matx 1012. The behavior of the filter operation F 1010 will be described in the following paragraphs. The input of all matchers $\{mat_1 \ldots mat_{x-1}\}$ will be changed to F. The filtered result of $mat_x$ will be added to the aggregation $Agg_{union}$ 1014 and the original result of $mat_x$ 1012 will be removed from the $Agg_{union}$ 1014. All matchers $\{mat_{x+1} \ldots mat_n\}$ that do not profit from $mat_x$ remain unchanged.

Figure 11:
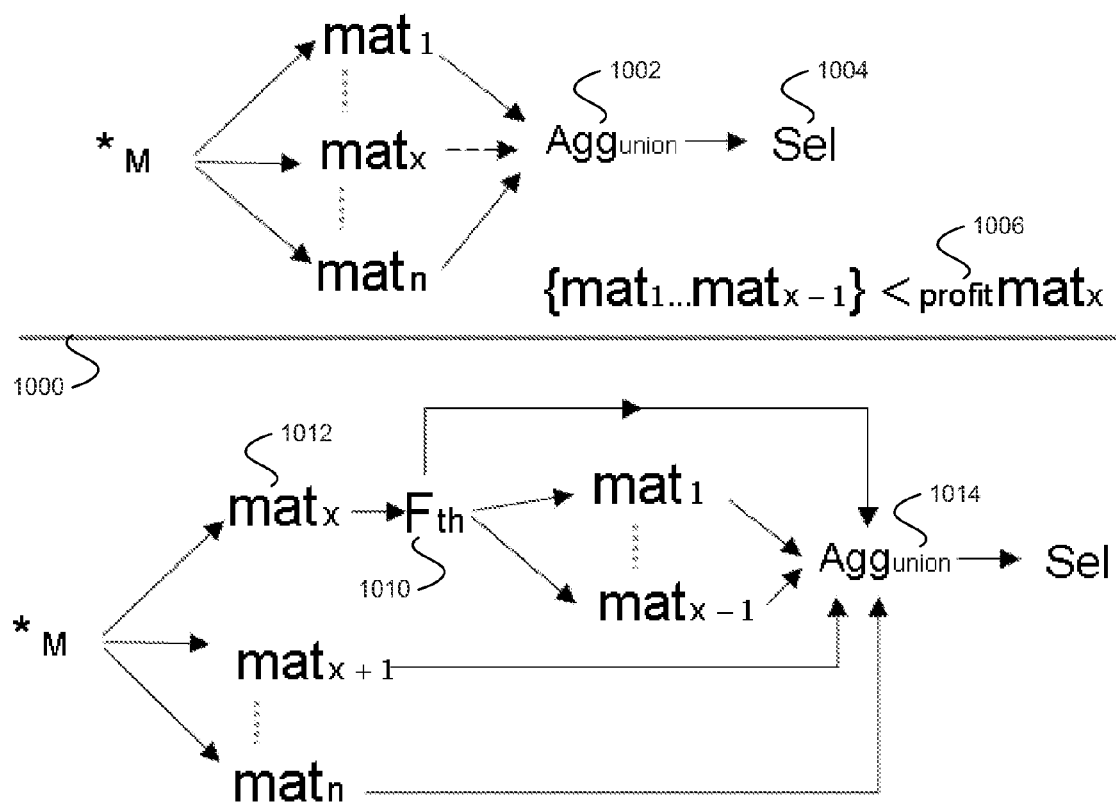
FIG. 11 shows a filter-based rewrite rule $Rule_M$.

The rule $Rule_S$ of FIG. 10 only covers patterns where the inputs are operators that provide schemas. Within complex matching processes that consist of sequential parts, the input to matchers could also be a mapping. In order to cover this, we added a second rewrite rule $Rule_M$ where the input is changed to *M. FIG. 11 shows the filter-based rewrite rule $Rule_M$.

After rewriting the process, the condition of the filter operation F 1010 may be defined. Embodiments of the present invention implement two types of filter conditions: a static and dynamic one.

Section 4.3.1: Static Filter Condition

The static filter condition is based on a threshold. We refer to the threshold-based static filter with $F_{th}$. If a similarity value $sim_{ij}$ in the input mapping is smaller than a given threshold, the comparison matrix entry is set to false. Each filter operation in a matching process could get different threshold-values that are adapted to the mapping they need to filter. In the rewrite the system reuses the annotated incidence graph that stores a filter threshold for each edge. If there are multiple outgoing edges from matcher $mat_x$ the system applies a defensive strategy: It sets the filter-condition to the smallest threshold of all outgoing edges in the incidence graph from $mat_x$ to matchers of $\{mat_1 \ldots mat_{x-1}\}$.

Section 4.3.2: Dynamic Filter Condition

The dynamic filter condition adapts itself to the already processed comparisons and mapping results. Its overall function is to filter out a comparison that already lost its chance to survive the final selection.

Given is a set of matchers $\{mat_1 \ldots mat_n\}$ that are contributing to a single aggregation operation $Agg_{union}$. Each matcher $mat_a \in \{mat_1 \ldots mat_n\}$ has a weight $w_a$ and computes an output mapping similarity value $sim_{aij}$. If the aggregation operation $Agg_{union}$ applies a weighted aggregation function $aggsim_{ij}$ which is defined as follows:

$$aggsim_{ij} = \Sigma w_m * sim_{mij}$$

then the chance of not being pruned out can be computed after a matcher $mat_x$ has been executed. Given the threshold $Sel_{threshold}$ of the final selection Sel the following condition can be checked:

$$\left(\sum_{\{mat_1 \ldots mat_n\}/mat_x} w_m * sim_{m_{ij}}\right) + w_x * sim_{x_{ij}} < Sel_{threshold}$$

If a matcher is not yet executed we consider it with the maximal possible similarity $sim_{mij}=1$. If the computed aggregated similarity is smaller than the $Sel_{threshold}$ then the comparison can be pruned by setting the respective cell in the comparison matrix to false (see 408 in FIG. 4).

When more matchers are already executed, the actual similarities of matcher $sim_{mij}$ are known so that it will be much more probable that an element pair will be pruned. The dynamic filter condition ensures that the result of a filtered execution will not differ from a parallel execution. However, in most cases the dynamic filter does only begin pruning element pairs after some matchers have been executed.

For example, imagine three matchers with weights w1=0.3, w2=0.4 and w3=0.3 that contribute to an aggregation operation $Agg_{union}$ and a following selection operation with a threshold of 0.7. If the first matcher computes a similarity for two elements $sim_{1ij}$=0.2 then the dynamic filter will not prune the comparison ((0.4*1+0.3*1)+0.2*0.3=0.76>0.7). The more matchers are involved, the more unlikely it is that an element pair will be pruned early on. If the second matcher results in $sim_{2ij}$=0.35 then the element pair can be pruned since it will never survive the selection, since ((0.4*0.35+0.3*1)+0.2*0.3=0.5<0.7).

This dynamic strategy can be softened by setting the worst case result similarities smaller than 1: $sim_{mij}$<1 for matchers that have not yet been executed. However, similar to the static filter condition, this could change the result of a matching process in comparison to the unchanged process.

Figures 12, 13:
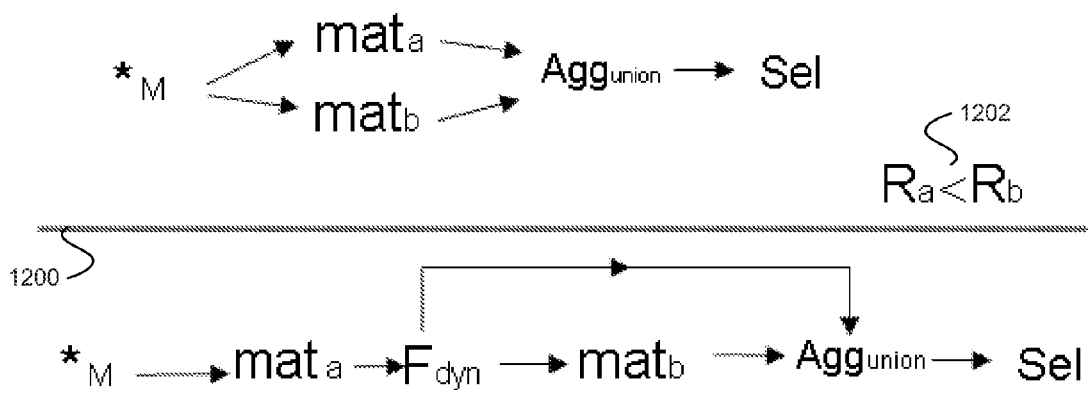
FIG. 12 is a diagram that shows a rewrite rule $Rule_{dyn}$.
FIG. 13 illustrates the applyRule process, according to an embodiment of the present invention.

Since applying the dynamic filter condition can be done between arbitrary matchers without changing the final result we add a further rewrite rule $Rule_{dyn}$. FIG. 12 is a diagram that shows the rewrite rule $Rule_{dyn}$. Whenever two matchers $mat_a$ and $mat_b$ are executed in parallel (see above the line 1200), we apply these matchers in sequence and put a dynamic filter operator $F_{dyn}$ in between them (see below the line 1200). The condition 1202 tries to ensure that the execution time of the first matcher $R_a$ is smaller than the execution time of $R_b$. Typically this rewrite rule will be applied after the other filter rules have already been executed. Note that there also is an equivalent rule where the inputs are schemas instead of mappings.

Section 4.4: Rewriting a Matching Process

To apply the matching process rewrite rule for filtering, the system implements a process to find suitable patterns for adaptation in order to improve performance. FIG. 13 illustrates the applyRule process, according to an embodiment of the present invention. The process applyRule takes an incidence graph IG, a matching process MP and a specific rewrite rule RW as input. First all matching pattern instances are identified in the given process (line 2). In line 5, for each pattern instance the cost C is computed as described in the following paragraph. The cost estimates are stored in a map (line 6). If the costMap is not empty, the best pattern instance is selected (line 8) and rewritten (line 9). The function applyRule will be called recursively (line 10) in order to iteratively rewrite all occurrences of the given pattern. The process terminates when the costMap is empty and all possible pattern instances are rewritten (see line 7).

The system uses a cost model based on the incidence graph to decide which pattern instance to rewrite for $Rule_S$ and $Rule_M$.

Definition 5. Given

The incidence graph that contains individual runtimes of matchers $R_m$ for all Mat matchers.

The percentage of relative speedup $P_{ab}$ between two matchers $mat_a, mat_b \in$ Mat as defined above. If there is no edge in the incidence graph from $mat_a$ to $mat_b$ then $P_{ab}$=0.

The cost $C_{x, \{1 \ldots n\}}$ of executing matcher $mat_x$ before a set of matchers $\{mat_1 \ldots mat_n\}$ can be computed by:

$$C_{x,\{1 \ldots n\}} = R_x + \sum_{a=1}^{n} (1 - P_{xa}) * R_a$$

The rationale behind this cost-model is the following: When the first matcher $mat_x$ is executed, its full runtime is considered. All matchers that have an incoming edge from $mat_x$ add a fraction of their runtime cost to the overall cost that depends on the anticipated relative speedup $P_{ab}$. Computing the cost of a parallel execution of the given matchers is straightforward. Only the runtime-cost of all individual matchers need to be summed up.

For example, taking the values from the example incidence graph 700 (see FIG. 7) the computed cost for first executing the name matcher 704 and then executing all other matchers is:
20+((1−0.55)*10)+((1−0.6)*50)+((1−0.71)*80)+((1−0.75)*80)+((1−0.69)*40)=100.1. Whereas first executing the name-path matcher 708 would generate a higher cost: 40+((1−0.49)*10)+((1−0.59)*20)+((1−0.55)*50)+((1−0.49)*80)+80=196.6.

Section 5: Matching Process Execution System

Figure 14:
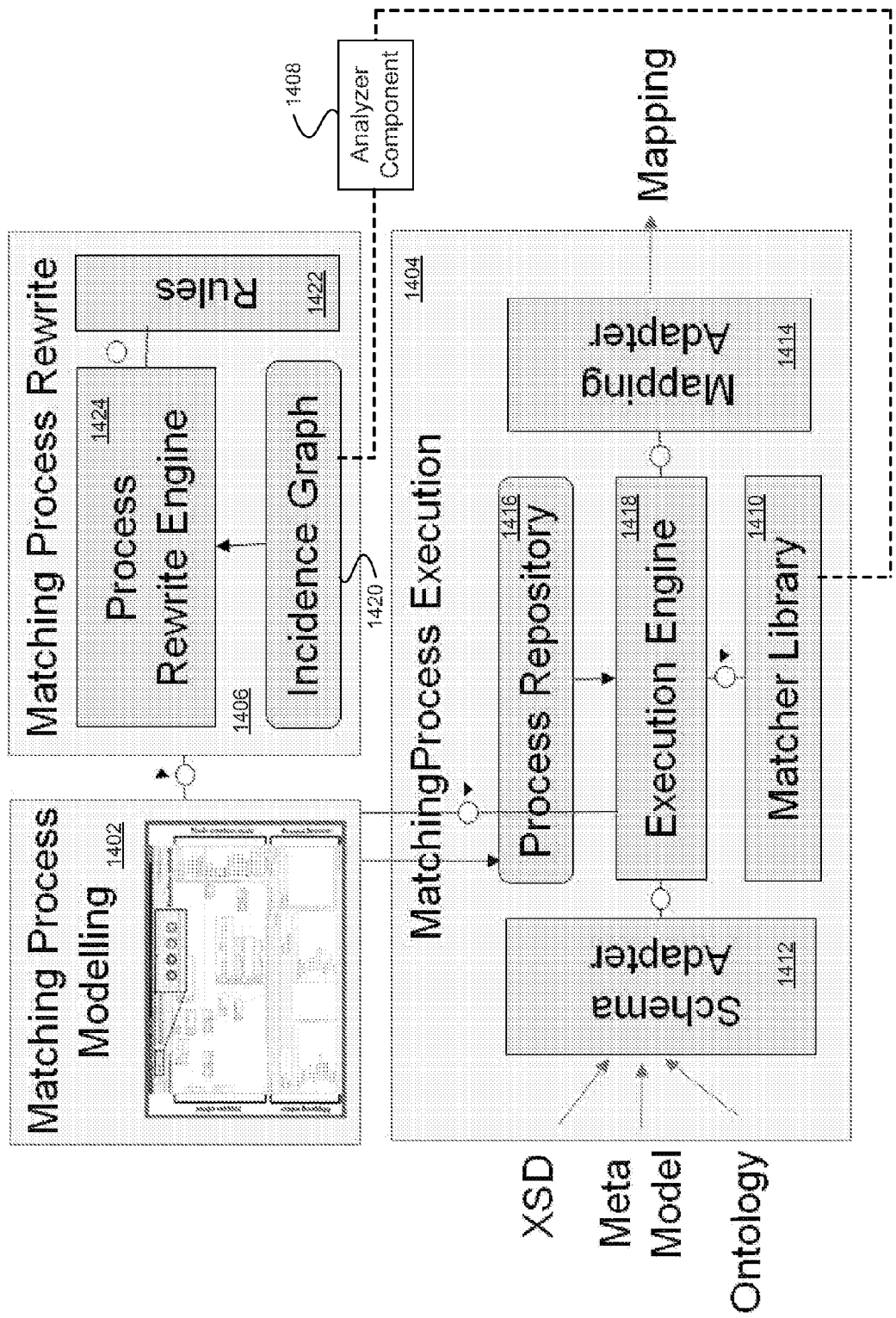
FIG. 14 shows the overall architecture of a system according to an embodiment of the present invention.

FIG. 14 shows the overall architecture of the system 1400 according to an embodiment of the present invention. The system 1400 includes a matching process modeling tool 1402, a matching process execution engine 1404, a matching process rewrite system 1406, and an analyzer component 1408.

The schema matching system 1400 executes schema matching processes. Matching processes are defined at design time by applying the matching process graph model (see, e.g., FIG. 1), as implemented by the matching process modeling tool 1402. The system 1400 is a meta matching system, i.e. it is agnostic towards the matcher library used. However, an embodiment implements a matcher library 1410 that includes a number of operators and matchers in the purchase order domain, as described above. The matching process execution engine 1404 includes a schema adapter 1412 in order to match XML schemas, meta models or ontologies. In order to do this, the schema adapter 1412 offers a number of adapters that transform these types of schemas into an internal model. Different selections of matchers can be used for defining a matching process for a specific domain. The matching process execution engine 1404 also includes a mapping adapter 1414 to export the found correspondences in domain specific mapping formats. The matching process execution engine 1404 also includes a process repository 1416 and an execution engine 1418. The process repository 1416 stores already defined processes for later reuse. Existing processes can be combined within new processes thus supporting reuse. The execution engine 1418 executes given matching processes, e.g., by stepping through a process and executing the individual operators. The individual operators then call operator implementations such as matchers from the matcher library 1410.

The matching process rewrite system 1406 generally implements the rewriting process described above (Section 4.4, etc.). The matching process rewrite system 1406 includes an incidence graph storage 1420, a rules storage 1422, and a process rewrite engine 1424. The incidence graph storage 1420 stores the incidence graph used by the system 1400 (e.g., the incidence graph 700). The rules storage 1422 stores the rewrite rules (see Section 4.3). The process rewrite engine 1424 rewrites the process (modeled by the matching process modeling tool 1402) according to the incidence graph and the rewrite rules.

The analyzer component 1408 analyzes a given matcher library (e.g., the operators and matchers in the purchase order domain as described above) stored in the matcher library 1410, determines the incidence properties of the given matcher library, and generates the incidence graph (e.g., the incidence graph 700) for storage in the incidence graph storage 1420.

Section 5.1: Matching Process Modeling Tool 1402

In order to simplify the design of matching processes, the system implements a graphical modeling tool for matching processes (e.g., the matching process modeling tool 1402). Further details of a graphical modeling tool that may be used with embodiments of the present invention are provided in U.S. application Ser. No. 12/627,382 for "System and Method of Schema Matching" filed Nov. 30, 2009. The matching process is visualized as a graph. This graph visualization makes relationships between operations and data explicit. Operations can be added to the graph by using drag and drop from the set of tools. An additional feature is the ability to contain another matching process as a subgraph. This hides complexity and improves reuse of processes. The user is able to easily drill down the hierarchy of subgraphs.

A problem with many other existing matching tools is that only highly skilled experts are able to exploit the auto matching potential. And even for them the process requires a high manual effort. Matching process designers model and tune matching processes to specific application areas. On request they are able to define new processes for given problem areas and store them in a central repository of "best practices" matching processes.

If a user within business applications like a business process modeling tool (see Section 1) wants to use auto matching, he simply gets a selection of predefined matching processes. The complexity of the underlying matching process is hidden to the user. He only has to select the most appropriate matching process for his matching problem which can be done automatically or supported through description.

The matching process modeling tool 1402 also implements debugging of matching processes. Matching process debugging is primarily intended for matching process designers. The system allows a graph designer to incrementally step through a matching process. On each step the input and output of an operation as well as its parameters can be visualized and changed using a graphical mapping view. Immediate feedback about the impact of parameter changes is given which helps to optimize individual parts of the process. The designer does not need to inspect concrete similarity values or matrices. Instead, the mapping visualization hides most of the complexity. Also the user is able to step back in a matching process, change parameters and operators and step forward with applied changes. This backward/forward stepping is useful in programming environments and helps to significantly improve the quality of a matching process. A user is able to exchange the order of operations. As discussed in Section 2 this may improve runtime performance.

Section 5.2: Rewrite Recommendation System

One feature of the matching process modeling tool 1402 is its connection to the developed matching process rewrite system described above. The rewrite system 1406 supports the matching process designer in the development and tuning of a matching process. First the designer creates a graph with a number of matchers and operations (e.g., using the matching process modeling tool 1402). While developing the process, the designer asks the rewrite recommendation system (e.g., the rewrite system 1406) to tune the performance of his strategy. The rewrite system 1406 applies automatic rewrites on the graph to increase performance and quality. These rewrites can be confirmed or rejected by the process designer. The rewritten graph can be further extended or changed by the designer before finally storing it in the process repository 1416. Besides the rewrite rules discussed above, further rules that improve speed as well as the quality of matching processes may be implemented in other embodiments.

Section 6: Evaluation

The evaluation below shows that the rewriting of matching processes can achieve a significant reduction of the overall execution time. The evaluation compares the performance impact of applying the dynamic filter operations on a process with parallel matchers in comparison to the use of the static threshold-based filter operation. Then the evaluation investigates the influence of the static filter condition threshold on the final FMeasure and the execution time. The results are quantified by measuring the execution time (in milliseconds or seconds depending on the size of the mapping problem). The common FMeasure is used to quantify the quality.

Section 6.1: Setup

For the evaluation we took three different sets of schemas from the purchase order domain:

A small set of simple purchase-order schemas that was taken by Do et al. in the COMA evaluation.

A set of mid-sized SAP customer and vendor schemas of new SAP solutions.

Big-sized SAP XI and SAP PI Business Partner schemas and an SAP SRM Purchase Order message type.

TABLE 1

| Schema Name | #Nodes | id |
|---|---|---|
| Apertum | 143 | S0 |
| Excel | 54 | S1 |
| CIDXPO | 40 | S2 |
| Noris | 56 | S3 |
| OpenTrans - Order | 535 | S4 |
| SAP Business One - Business Partner | 198 | S5 |
| SAP New - Vendor | 173 | S6 |
| SAP New - Customer | 222 | S7 |
| SAP PI - Business Partner Message | 3953 | S8 |
| SAP XI - Business Partner | 904 | S9 |
| SAP SRM - Purchase Order | 5286 | S10 |

TABLE 1 lists the different schemas used, the number of nodes of the schemas and a reference id for use in the description of the experiments. The chosen schemas exhibit most characteristics of complex matching scenarios such as verbose naming, flat structures and deeply nested structures. Also the size of the schemas is quite heterogeneous ranging from 40 elements to more than 5000 elements. For the evaluation the system executed several matching processes for computing mappings between combinations of the given schemas.

The system computed the incidence graph for that matching library with 5 matchers: Name, Namepath, Leaf, Child, Parent and applied the following different rewrite rules:

(a) Parallel: First, no rewrite is applied and a parallel matching process is constructed.
(b) SequentialThreshold: The system applied the rewrite rules $Rule_S$ and $Rule_M$ to the parallel process. For the filter-operator the system took the static filter $F_{th}$.
(c) SequentialDynamic: The system applied the rewrite rules $Rule_S$ and $Rule_M$ to the parallel process, but instead of $F_{th}$ the system took the dynamic filter $F_{dyn}$.
(d) SequentialBoth: The system applied $Rule_{dyn}$ onto the rewritten process from (b) to bring the remaining parallel operations in a sequence with a dynamic filter.

Figure 15:
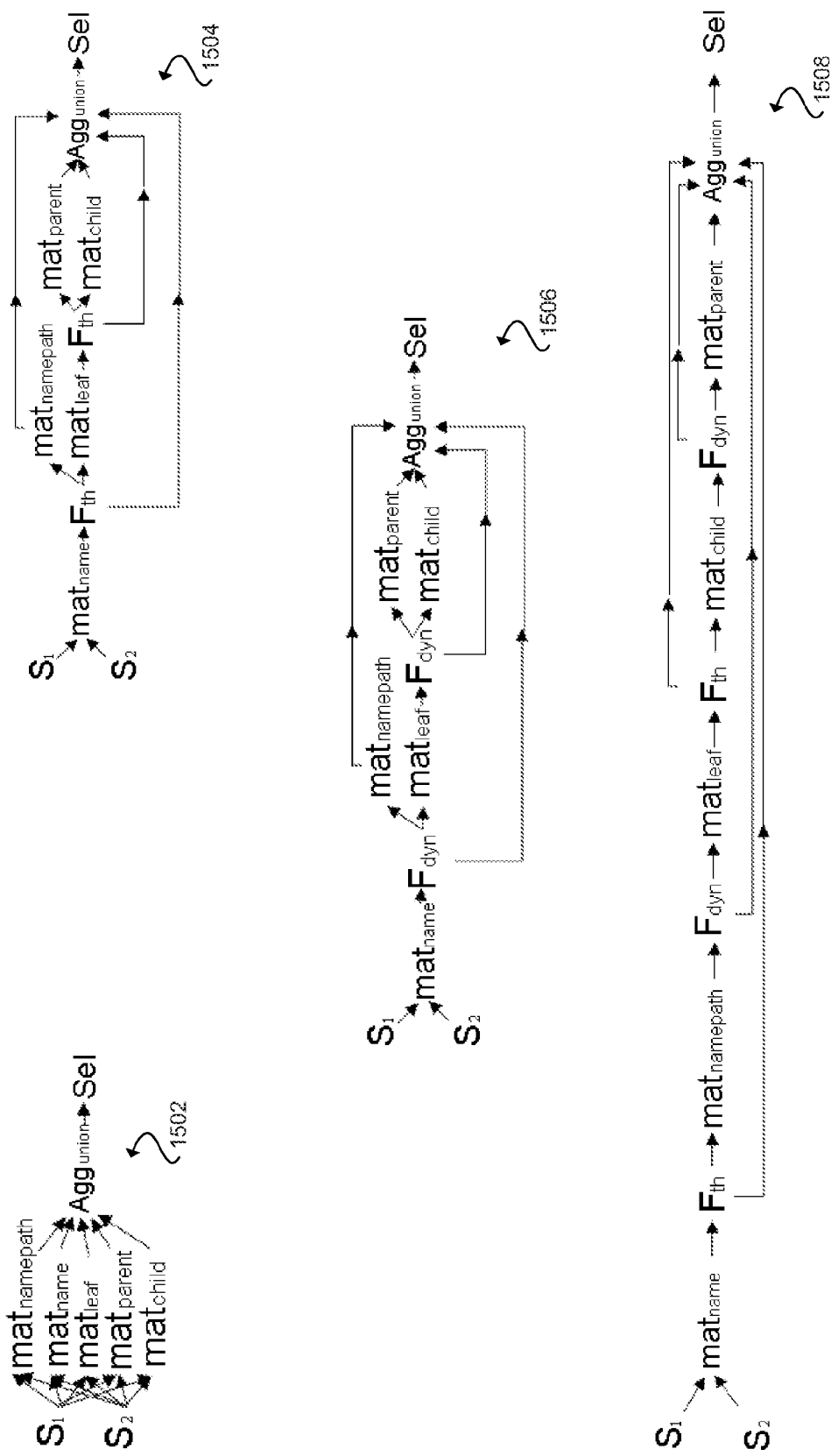
FIG. 15 is a diagram that visualizes all the generated matching processes used in the evaluation.

FIG. 15 is a diagram that visualizes all the generated matching processes used in the evaluation. The matching process 1502 is the Parallel matching process. The matching process 1504 is the SequentialThreshold matching process. The matching process 1506 is the SequentialDynamic matching process. The matching process 1508 is the Sequential-Both matching process.

Section 6.2: Results

Figure 16:
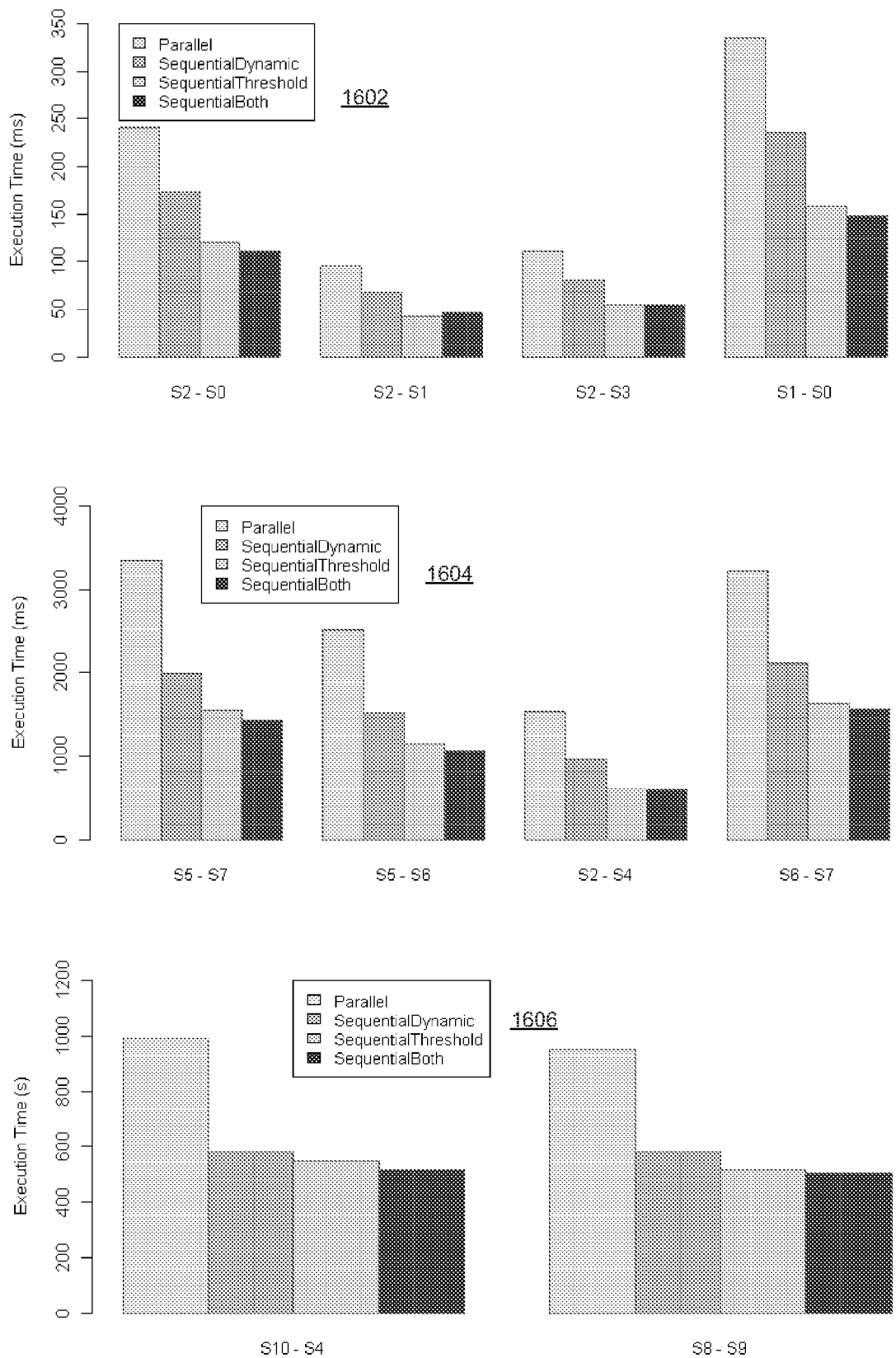
FIG. 16 shows the execution time results of the four evaluated matching processes on different combinations of schemas.

FIG. 16 shows the execution time results of the four evaluated matching processes on different combinations of schemas. The graph 1602 shows the execution time for small-sized schemas, the graph 1604 shows the execution time for small-sized schemas, and the graph 1606 shows the execution time for small-sized schemas. As can be seen in all cases, the execution times of the rewritten processes are significantly smaller. The improvement is stable over different sizes of schemas. It can be seen that applying the rewrite rules $Rule_M$ and $Rule_S$ and using the dynamic filter improves the performance by about 30-40% (SequentialDynamic). Here it is important to note that the result quality will never be different from its parallel combined equivalent (Parallel). By using the threshold-based process (SequentialThreshold) execution time is reduced by about 50%. For those schemas where we have a gold-standard mapping we could see that the FMeasure did also not deteriorate. This was achieved by a conservative filter condition to not prune element pairs relevant for the final result. By applying the $Rule_{dyn}$ on a process that was already rewritten using a threshold-based filter an additional improvement can be achieved (SequentialBoth). Note that the first matcher still has to compute the full cross-product of source and target schema elements since the first filter is applied after that matcher. Therefore a significant part of the remaining 50% execution time is lost for that first matcher. By combining the rewrite rules with clustering or blocking strategies (see Section 2) the system may further reduce the overall execution time significantly. Moreover, the rewrite rules allow the system to execute a matching process with more matchers within the same time-frame which could improve the matching quality.

Section 7: Conclusion

Embodiments of the present invention implement a generic approach to optimize the performance of matching processes. The system is based on rewrite rules and is similar to rewrite-based optimization of database queries. The system implements filter-based rewrite rules comparable to predicate push-down in database query plans.

The system implements two versions of the filter-based strategy, a dynamic and static one. With this approach the system is able to speedup matching processes executing several matchers in parallel. The system rewrites the parallel processes into sequential processes and improves the performance significantly by early pruning many irrelevant element combinations. The evaluation shows the effectiveness of the rewrite approach on a number of SAP service interfaces that need to be matched when modeling Business Processes.

Also the system further simplifies the modeling of matching processes by implementing a dedicated graphical modeling tool. This tool significantly reduces the time for a matching process designer to create and tune a matching process to his needs. The system implements a recommender system that makes use of the presented rewrite rules.

FIG. 17 is a block diagram of an example computer system and network 2400 for implementing embodiments of the present invention. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM), or both. A storage device 2403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2403 may include source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, the client 2415 may implement a client-side interface for displaying information generated by the server, for example via HTML or HTTP data exchanges. The computer system 2410 may implement the system 1400, the method 800, and the method 300, for example by executing one or more computer programs. For example, the storage device 2403 may implement the matching process repository 1416. The processor 2401 may implement the matching process execution engine 1418. The client 2415 may implement a graphical user interface for interacting with the matching process modeling tool 1402. Further note that the process repository 1416 and the execution engine 1418 may be implemented by different servers, e.g., the server 2410 may implement the process repository 1416 and server 2431 may implement the execution engine 1418.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of improving performance of schema matching, comprising:
    storing, by a computer system, a matching topology that maps a first data structure to a second data structure;
    identifying, by the computer system, a first portion of the matching topology that is a candidate for improvement as determined according to an incidence graph, wherein the incidence graph comprises a plurality of nodes, a plurality of edges between the plurality of nodes, a plurality of average runtimes associated with the plurality of nodes, and a plurality of speedup values associated with the plurality of edges, including:
        calculating a first cost of executing a first node before a second node according to a first average runtime and a first speedup value,
        calculating a second cost of executing the second node before the first node according to a second average runtime and a second speedup value, and
        comparing the first cost and the second cost; and
    rewriting, by the computer system, the first portion of the matching topology with a second portion according to the incidence graph.

2. The computer-implemented method of claim 1, further comprising generating the incidence graph, wherein generating the incidence graph comprises:
    storing, by the computer system, a matcher library that includes a plurality of mapping operations;
    selecting, by the computer system, a first mapping operation and a second mapping operation of the plurality of mapping operations;
    performing, by the computer system, a sequential execution of the first mapping operation and the second mapping operation;
    performing, by the computer system, a parallel execution of the first mapping operation and the second mapping operation;
    comparing, by the computer system, the sequential execution and the parallel execution; and
    generating, by the computer system, the incidence graph according to the sequential execution and the parallel execution having been compared.

3. The computer-implemented method of claim 1, wherein rewriting the first portion comprises:
    rewriting, by the computer system, the first portion of the matching topology with the second portion according to a filter-based rewrite rule.

4. The computer-implemented method of claim 1, wherein the matching topology comprises a matching process graph, the first data structure comprises a first schema, and the second data structure comprises a second schema.

5. The computer-implemented method of claim 1, wherein the matching topology comprises a matching process graph, the first data structure comprises a first mapping, the second data structure comprises a second mapping.

6. The computer-implemented method of claim 1, wherein the first portion includes a parallel structure, and wherein the second portion includes a filter and a sequential structure.

7. The computer-implemented method of claim 1, wherein the first portion includes a parallel structure, wherein the second portion includes a filter and a sequential structure, and wherein the filter includes a static filter condition.

8. The computer-implemented method of claim 1, wherein the first portion includes a parallel structure, wherein the second portion includes a filter and a sequential structure, and wherein the filter includes a dynamic filter condition.

9. The computer-implemented method of claim 1, further comprising:
    iteratively identifying a plurality of first portions and rewriting the plurality of first portions with a respective plurality of second portions.

10. The computer-implemented method of claim 1, further comprising:
    storing, by the computer system, an improved matching topology that comprises the matching topology having been rewritten to include the second portion.

11. The computer-implemented method of claim 1, further comprising:
    receiving, by the computer system, a selection by a user between the first portion and the second portion,
    wherein rewriting the first portion comprises rewriting the first portion with the second portion according to the selection by the user.

12. The computer-implemented method of claim 1, further comprising:
    computing, by the computer system according to the incidence graph, a first portion cost of executing the first portion and a second portion cost of executing the second portion, wherein a comparison of the first portion cost and the second portion cost indicates that the first portion is a candidate for improvement.

13. A computer program, embodied on a tangible non-transitory recording medium, for controlling a computer system to improve performance of schema matching, the computer program comprising:
    a storage program that is configured to control the computer system to store a matching topology that maps a first data structure to a second data structure;
    an identification program that is configured to control the computer system to identify a first portion of the matching topology that is a candidate for improvement as determined according to an incidence graph, wherein the incidence graph comprises a plurality of nodes, a plurality of edges between the plurality of nodes, a plurality of average runtimes associated with the plurality of nodes, and a plurality of speedup values associated with the plurality of edges,
    wherein the identification program is further configured to control the computer system to calculate a first cost of executing a first node before a second node according to a first average runtime and a first speedup value,
    wherein the identification program is further configured to control the computer system to calculate a second cost of executing the second node before the first node according to a second average runtime and a second speedup value, and
    wherein the identification program is further configured to control the computer system to compare the first cost and the second cost; and
a rewrite program that is configured to control the computer system to rewrite the first portion of the matching topology with a second portion according to the incidence graph.

14. The computer program of claim 13, further comprising:
an analyzer program that is configured to control the computer system to generate the incidence graph.

15. The computer program of claim 13, further comprising:
an analyzer program that is configured to control the computer system to generate the incidence graph,
wherein the storage program is configured to control the computer system to store a matcher library that includes a plurality of mapping operations,
wherein the analyzer program is configured to control the computer system to select a first mapping operation and a second mapping operation of the plurality of mapping operations,
wherein the analyzer program is configured to control the computer system to perform a sequential execution of the first mapping operation and the second mapping operation,
wherein the analyzer program is configured to control the computer system to perform a parallel execution of the first mapping operation and the second mapping operation,
wherein the analyzer program is configured to control the computer system to compare the sequential execution and the parallel execution, and
wherein the analyzer program is configured to control the computer system to generate the incidence graph according to the sequential execution and the parallel execution having been compared.

16. The computer program of claim 13, wherein the rewrite program is configured to control the computer system to rewrite the first portion of the matching topology with the second portion according to a filter-based rewrite rule.

17. The computer program of claim 13, wherein the matching topology comprises a matching process graph, the first data structure comprises a first schema, and the second data structure comprises a second schema.

18. The computer program of claim 13, wherein the matching topology comprises a matching process graph, the first data structure comprises a first mapping, the second data structure comprises a second mapping.

19. The computer program of claim 13, wherein the first portion includes a parallel structure, and wherein the second portion includes a filter and a sequential structure.

20. The computer program of claim 13, wherein the first portion includes a parallel structure, wherein the second portion includes a filter and a sequential structure, and wherein the filter includes a static filter condition.

21. The computer program of claim 13, wherein the first portion includes a parallel structure, wherein the second portion includes a filter and a sequential structure, and wherein the filter includes a dynamic filter condition.

22. The computer program of claim 13, wherein the identification program is configured to control the computer system to iteratively identify a plurality of first portions, and wherein the rewrite program is configured to control the computer system to rewrite the plurality of first portions with a respective plurality of second portions.

23. The computer program of claim 13, wherein the storage program is configured to control the computer system to store an improved matching topology that comprises the matching topology having been rewritten to include the second portion.

24. The computer program of claim 13, wherein the computer program is configured to control the computer system to receive a selection by a user between the first portion and the second portion,
    wherein the rewrite program is configured to control the computer system to rewrite the first portion with the second portion according to the selection by the user.

25. The computer program of claim 13, wherein the identification program is configured to control the computer system to compute, according to the incidence graph, a first portion cost of executing the first portion and a second portion cost of executing the second portion, wherein a comparison of the first portion cost and the second portion cost indicates that the first portion is a candidate for improvement.

26. A system for improving performance of schema matching, comprising:
a server computer that is configured to connect to a client computer via a network,
wherein the server computer is configured to store a matching topology that maps a first data structure to a second data structure,
wherein the server computer is configured to identify a first portion of the matching topology that is a candidate for improvement as determined according to an incidence graph, wherein the incidence graph comprises a plurality of nodes, a plurality of edges between the plurality of nodes, a plurality of average runtimes associated with the plurality of nodes, and a plurality of speedup values associated with the plurality of edges,
    wherein the server computer is further configured to calculate a first cost of executing a first node before a second node according to a first average runtime and a first speedup value,
    wherein the server computer is further configured to calculate a second cost of executing the second node before the first node according to a second average runtime and a second speedup value, and
    wherein the server computer is further configured to compare the first cost and the second cost,
wherein the server computer is configured to rewrite the first portion of the matching topology with a second portion according to the incidence graph, and
wherein the server computer is configured to receive user input via the client computer to edit the matching topology.

27. The system of claim 26, wherein the server computer is configured to generate the incidence graph.

28. The system of claim 26, wherein the server computer is configured to store a matcher library that includes a plurality of mapping operations,
wherein the server computer is configured to select a first mapping operation and a second mapping operation of the plurality of mapping operations, wherein the server computer is configured to perform a sequential execution of the first mapping operation and the second mapping operation, wherein the server computer is configured to perform a parallel execution of the first mapping operation and the second mapping operation, wherein the server computer is configured to compare the sequential execution and the parallel execution, and wherein the server computer is configured to generate the incidence graph according to the sequential execution and the parallel execution having been compared.

29. The system of claim 26, wherein the server computer is configured to rewrite the first portion of the matching topology with the second portion according to a filter-based rewrite rule.

30. The system of claim 26, wherein the matching topology comprises a matching process graph, the first data structure comprises a first schema, and the second data structure comprises a second schema.

31. The system of claim 26, wherein the matching topology comprises a matching process graph, the first data structure comprises a first mapping, the second data structure comprises a second mapping.

32. The system of claim 26, wherein the first portion includes a parallel structure, and wherein the second portion includes a filter and a sequential structure.

33. The system of claim 26, wherein the first portion includes a parallel structure, wherein the second portion includes a filter and a sequential structure, and wherein the filter includes a static filter condition.

34. The system of claim 26, wherein the first portion includes a parallel structure, wherein the second portion includes a filter and a sequential structure, and wherein the filter includes a dynamic filter condition.

35. The system of claim 26, wherein the server computer is configured to iteratively identify a plurality of first portions, and to rewrite the plurality of first portions with a respective plurality of second portions.

36. The system of claim 26, wherein the server computer is configured to store an improved matching topology that comprises the matching topology having been rewritten to include the second portion.

37. The system of claim 26, wherein the server computer is configured to receive a selection by a user between the first portion and the second portion, and to rewrite the first portion with the second portion according to the selection by the user.

38. The system of claim 26, wherein the server computer is configured to compute, according to the incidence graph, a first portion cost of executing the first portion and a second portion cost of executing the second portion, wherein a comparison of the first portion cost and the second portion cost indicates that the first portion is a candidate for improvement.

* * * * *